United States Patent
Kobayashi et al.

(10) Patent No.: US 11,795,062 B2
(45) Date of Patent: Oct. 24, 2023

(54) ELECTRON OR HYDRIDE ION INTAKE/RELEASE MATERIAL, ELECTRON OR HYDRIDE ION INTAKE/RELEASE COMPOSITION, TRANSITION METAL-SUPPORTED MATERIAL AND CATALYST, AND USE IN RELATION THERETO

(71) Applicant: JAPAN SCIENCE AND TECHNOLOGY AGENCY, Kawaguchi (JP)

(72) Inventors: Yoji Kobayashi, Kyoto (JP); Hiroshi Kageyama, Kyoto (JP); Hiroki Yamashita, Kyoto (JP); Thibault Broux, Kyoto (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 530 days.

(21) Appl. No.: 16/980,166

(22) PCT Filed: Mar. 13, 2019

(86) PCT No.: PCT/JP2019/010175
§ 371 (c)(1),
(2) Date: Sep. 11, 2020

(87) PCT Pub. No.: WO2019/176987
PCT Pub. Date: Sep. 19, 2019

(65) Prior Publication Data
US 2021/0002142 A1    Jan. 7, 2021

(30) Foreign Application Priority Data
Mar. 14, 2018   (JP) .................................. 2018-046846

(51) Int. Cl.
*B01J 23/10*   (2006.01)
*B01J 23/12*   (2006.01)
(Continued)

(52) U.S. Cl.
CPC ............... *C01F 17/20* (2020.01); *B01J 23/63* (2013.01); *C01C 1/0411* (2013.01); *C01F 17/224* (2020.01)

(58) Field of Classification Search
CPC ... B01J 23/10; B01J 23/12; B01J 23/63; B01J 23/83; B01J 23/86; B01J 23/8892;
(Continued)

(56) References Cited

U.S. PATENT DOCUMENTS

| | | | |
|---|---|---|---|
| 7,304,012 B2 | 12/2007 | Green et al. | |
| 7,498,005 B2 * | 3/2009 | Yadav | C01F 17/235 977/773 |

(Continued)

FOREIGN PATENT DOCUMENTS

| | | |
|---|---|---|
| CN | 1662300 A | 8/2005 |
| CN | 104640628 A | 5/2015 |

(Continued)

OTHER PUBLICATIONS

Liu, X. et al., "Thermochemical properties of rare-earth oxyhydrides from first principles phonon calculations", RSC Advances, 2016, vol. 6, No. 12, pp. 9822-9826.
(Continued)

*Primary Examiner* — Cam N. Nguyen
(74) *Attorney, Agent, or Firm* — BUCHANAN INGERSOLL & ROONEY PC

(57) ABSTRACT

The present invention is to provide an electron or hydride ion intake/release material comprising a lanthanoid oxyhydride represented by the formula Ln(HO) (in the formula, Ln represents a lanthanoid element) or an electron or hydride
(Continued)

ion intake/release composition comprising at least one kind of lanthanoid oxyhydride; a transition metal-supported material wherein a transition metal is supported by the above electron or hydride ion intake/release material or electron or hydride ion intake/release composition; and a catalyst comprising the transition metal-supported material. The electron or hydride ion intake/release material or electron or hydride ion intake/release composition according to the present invention has a higher ability for intake/release of electron or hydride ion than that of a conventional hydride-containing compound, and can be used effectively as a catalyst such as a catalyst having excellent ammonia synthesis activity by supporting a transition metal thereon.

20 Claims, 4 Drawing Sheets

(51) Int. Cl.
  *B01J 23/63* (2006.01)
  *B01J 23/83* (2006.01)
  *B01J 23/86* (2006.01)
  *B01J 23/88* (2006.01)
  *B01J 23/89* (2006.01)
  *B01J 37/04* (2006.01)
  *B01J 37/06* (2006.01)
  *B01J 37/08* (2006.01)
  *C01C 1/04* (2006.01)
  *C01F 17/20* (2020.01)
  *C01F 17/224* (2020.01)

(58) Field of Classification Search
  CPC . B01J 23/894; B01J 37/04; B01J 37/06; B01J 37/08; C01C 1/0411; C01F 17/20; C01F 17/224
  See application file for complete search history.

(56) References Cited

U.S. PATENT DOCUMENTS

| | | | |
|---|---|---|---|
| 7,641,875 B1* | 1/2010 | Golden | C01G 53/006 502/313 |
| 9,440,228 B2 | 9/2016 | Iosono et al. | |
| 9,981,845 B2 | 5/2018 | Hosono et al. | |
| 10,017,395 B2 | 7/2018 | Kageyama et al. | |
| 10,322,940 B2 | 6/2019 | Hosono et al. | |
| 10,717,068 B2* | 7/2020 | Liang | B01J 23/002 |
| 2002/0006374 A1* | 1/2002 | Kourtakis | B01J 23/86 502/304 |
| 2002/0009406 A1* | 1/2002 | Kourtakis | B01J 23/86 423/418.2 |
| 2004/0052725 A1* | 3/2004 | Niu | B01J 23/63 502/302 |
| 2005/0250863 A1 | 11/2005 | Green et al. | |
| 2014/0128252 A1 | 5/2014 | Hosono et al. | |
| 2015/0217278 A1 | 8/2015 | Hosono et al. | |
| 2016/0340182 A1 | 11/2016 | Hosono et al. | |
| 2017/0088433 A1 | 3/2017 | Kageyama et al. | |
| 2017/0355607 A1 | 12/2017 | Iosono et al. | |
| 2020/0406240 A1* | 12/2020 | Rosen | B01J 23/755 |

FOREIGN PATENT DOCUMENTS

| | | |
|---|---|---|
| CN | 107206363 A | 9/2017 |
| EP | 0273575 A2 | 7/1988 |
| JP | 2011-204632 A | 10/2011 |
| JP | 2017-98067 A | 6/2017 |
| WO | 2013/008705 A1 | 1/2013 |
| WO | 2015/136954 A1 | 9/2015 |

OTHER PUBLICATIONS

Aubriet, F. et al., "Cerium oxyhydroxide clusters: formation, structure, and reactivity", The Journal of Physical Chemistry A, 2009, vol. 113, No. 22, pp. 6239-6252.

Samata, H. et al., "Synthesis of lanthanum oxyhydroxide single crystals using an electrochemical method", Journal of Crystal Growth, 2007, vol. 304, No. 2, pp. 448-451.

Hardaway, J. B. et al., "Synthesis and Crystal Structure of the New Samarium Oxyhydroxide, SmO(OH)", Journal of Chemical Crystallography, 2013, vol. 43, No. 5, pp. 282-284.

Extended European Search Report dated Nov. 22, 2021, by the European Patent Office in corresponding EP application No. 19768487.1. (10 pages).

Brice et al., "Synthesis and anionic conductivity of hydride oxides: LaHO, LaH1+2xo1−x and LaH1+yo1−x (y<2x)", Annales de Chimie, 1982, vol. 7, pp. 623-634.

Fukui et al., "High H-ion conduction at intermediate temperature in LaHxO(3−x)/2", Annual Meeting of the Ceramic Society of Japan, 2018, The Ceramic Society of Japan, 2018, 2F04. (2 pages).

Malaman et al., "Etude structurale de l'hydruro-oxyde LaHO par diffraction des rayons X et par diffraction des neutrons", Journal of Solid State Chemistry, 1984, vol. 53, pp. 44-54.

Miniotas et al., "Gigantic resistivity and band gap changes in GdOyHx thin films", Applied Physics Letters, 2000, vol. 76, No. 15, pp. 2056-2058.

Nafezarefi et al., "Photochromism of rare-earth metal-oxyhydrides", Applied Physics Letters, 2017, vol. 111, pp. 103903-1-103903-5.

Sato et al., "A low-crystalline ruthenium nano-layer supported on praseodymium oxide as an active catalyst for ammonia synthesis", Chemical Science, 2017, vol. 8, pp. 674-679.

Wideroe et al., "NdHO, a novel oxyhydride", Journal of Solid State Chemistry, 2011, vol. 184, pp. 1890-1894.

Written Opinion of the International Searching Authority dated May 28, 2019, by the Japanese Patent Office in corresponding International Patent Application No. PCT/JP2019/010175, and an English translation of the Written Opinion. (10 pages).

International Search Report dated May 28, 2019, by the Japanese Patent Office in corresponding International Patent Application No. PCT/JP2019/010175 and an English translation of the Report. (5 pages).

Office Action and Search Report dated Apr. 15, 2022, by the State Intellectual Property Office of the People's Republic of China in corresponding Chinese Patent Application No. 201980017648.0, and an English translation of the Office Action. (19 pages).

Office Action (the Second Office Action) dated Sep. 27, 2022, by the State Intellectual Property Office of People's Republic of China in corresponding Chinese Patent Application No. 201980017648.0, and an English translation of the Office Action. (16 pages).

Yamashita, H. et al., "Chemical Pressure-induced Anion Order-disorder Transition in LnHO Enabled by Hydride Size Flexibility," Journal of American Chemical Society, 2018, vol. 140, Issue 36, pp. 11170-11173.

Tuncel, S. et al., "Synthesis, Structure and Chemical Bonding of RE4RuMg (RE=La—Nd, Sm, Gd—Ho)," Journal of Inorganic and General Chemistry, 2007, vol. 633, Issue 11-12, pp. 2019-2024.

Niwa, Y. et al., "The Effect of Lanthanide Oxides as a Support for Ruthenium Catalysts in Ammonia Synthesis," Journal of Catalysis, 1996, vol. 162, Issue 1, pp. 138-142.

* cited by examiner

ELECTRON OR HYDRIDE ION INTAKE/RELEASE MATERIAL, ELECTRON OR HYDRIDE ION INTAKE/RELEASE COMPOSITION, TRANSITION METAL-SUPPORTED MATERIAL AND CATALYST, AND USE IN RELATION THERETO

TECHNICAL FIELD

The present invention relates to an electron or hydride ion intake/release material, an electron or hydride ion intake/release composition, a transition metal-supported material and a catalyst, and use in relation thereto, and specifically relates to an electron or hydride ion intake/release material using a lanthanoid oxyhydride, an electron or hydride ion intake/release composition comprising a lanthanoid oxyhydride, a transition metal-supported material in which a transition metal is supported by the electron or hydride ion intake/release material or electron or hydride ion intake/release composition, a catalyst comprising the transition metal-supported material (further, a catalyst having hydrogen reduction activity, and a catalyst having ammonia synthesis activity), use of the lanthanoid oxyhydride as an electron or hydride ion intake/release material, and use of the transition metal-supported material as a catalyst. In this regard, the expression "hydrogen reduction activity" means ability to enhance the reactivity of the reduction reaction using hydrogen gas or a hydrogen compound as a reducing agent, and to promote the reaction.

BACKGROUND ART

Ammonia synthesis is one of the fundamental processes in chemical industries, and a Haber-Bosch method, which uses an iron oxide as a catalyst and potassium hydroxide as a promoter, has been widespread, and this method has not been largely changed for around 100 years. In the ammonia synthesis by the Haber-Bosch method, the synthesis is performed by reacting nitrogen gas with hydrogen gas on a catalyst under a high temperature of 300° C. to 500° C. and a high pressure of 20 to 40 MPa. The reaction for synthesizing ammonia by using a gas containing hydrogen and nitrogen as the raw material is represented by $N_2 + 3H_2 \leftrightarrow 2NH_3$. However, since this reaction is an exothermic reaction, the lower the temperature is, the better it is to shift the equilibrium to the right, but since the number of molecules is decreased by the reaction, the higher the pressure is, the better it is to shift the equilibrium to the right.

However, since the nitrogen molecule has an extremely strong triple bond between the nitrogen atoms, the reactivity is extremely poor, and the reaction between nitrogen and hydrogen is extremely slow. Accordingly, it has been extremely important to develop a catalyst that can break the triple bond of the nitrogen molecule and activate the nitrogen molecule. Haber et al. have used an iron ore as a catalyst, but this iron ore contains an iron oxide as a main component and also contains alumina and potassium oxide. In the Haber-Bosch method, an iron oxide is packed in a reaction device as a catalyst, but what actually reacts is metal iron generated by reduction with hydrogen. Alumina functions as a support without being reduced and prevents iron particles from being sintered, and potassium oxide donates electrons to iron particles as a base to enhance the catalytic ability. Because of these actions, it is called "doubly promoted iron catalyst". However, even if this iron catalyst is used, the reaction rate is insufficient at a low temperature of 400° C. or less.

In a conventional industrial technique, hydrogen is produced by reforming natural gas or the like, the hydrogen is reacted with nitrogen in the air under the above-described conditions in the same plant, and ammonia is synthesized. As the catalyst for ammonia synthesis, conventionally, $Fe/Fe_3O_4$ has been mainly used, but in recent years, an Fe/C or Ru/C catalyst using activated carbon as a support has been also used.

It is known that when metal catalyst particles for ammonia synthesis are formed by supporting Ru on a support and ammonia synthesis is performed by using the metal catalyst particles, the reaction proceeds at a low pressure, and thus such a catalyst has attracted attention as a second-generation catalyst for ammonia synthesis. However, the catalytic activity of Ru as a single substance is extremely small, and in order to exert the ability to break the triple bond of a nitrogen molecule and convert the nitrogen molecule to adsorbed nitrogen atoms on a Ru metal catalyst particle, it is preferred to simultaneously use a material having a high electron donating property, and it is better to use a support including a basic material in place of $Fe_3O_4$ or activated carbon, or to use a promoter compound such as an alkali metal, an alkali metal compound, or an alkaline earth metal compound.

On the other hand, a titanium-containing oxide having a perovskite-type crystal structure or a layered perovskite-type crystal structure, represented by $MTiO_3$ (M represents Ca, Ba, Mg, Sr, or Pb), a titanium-containing oxide in which some of the Ti atoms are replaced with at least one kind of Hf and Zr, and the like (collectively referred to as "titanium-containing perovskite-type oxide") each have an extremely high relative dielectric constant, and therefore, have been actively studied for a long period of time as a device such as a capacitor material, or a dielectric film, and also from the viewpoint of, for example, the application to a substrate material of other perovskite-type transition metal oxides, and a non-linear resistor.

In Patent Literature 1, synthesis of a titanate oxyhydride based on the formula $ATi(O, H)_3$ (A represents $Ca^{2+}$, $Sr^{2+}$, or $Ba^{2+}$) has been reported, and this oxyhydride is a compound in which hydrogen is allowed to coexist as hydride ($H^-$) with oxide ion ($O^{2-}$), and is prepared by a method for reducing a precursor $ATiO_3$ to a topochemical with a metal hydride such as $CaH_2$, $LiH$, or $NaH$ (in this regard, the expression "topochemical" means that the molecular structure of a resulting material is governed by the crystal structure before the reaction). This oxyhydride is characterized by having hydride ion-electron mixed conductivity, hydrogen storage, and release performance (that is, an ability for intake/release of electron or an ability for intake/release of hydride ion).

Patent Literature 2 has disclosed that when a catalyst is formed by using a titanium-containing perovskite-type oxyhydride in which hydride ($H^-$) has contained, as a support and supporting a metal exhibiting catalytic activity such as Ru or Fe on the support, the ammonia synthesis activity is dramatically improved due to the unique effect of hydride ($H^-$), the catalyst is stable also in a reaction for a long period of time without using an alkali metal or an alkaline earth metal, or a compound thereof, which is unstable, as a promoter compound, and thus, the catalyst becomes an ammonia synthesis catalyst having significantly higher activity as compared with the conventional catalyst known to have the highest activity, and highly efficient ammonia synthesis at a low pressure of less than 20 MPa can be realized. Further, Patent Literature 2 has disclosed that when a Ti-containing perovskite-type oxyhydride is heated to a low temperature of 400 to 600° C. in an ammonia gas or N₂/H₂ mixed air flow, nitride ions are introduced through a process of H/N exchange between hydride (H) and nitrogen (N), and BaTi(O, H, N)₃ is formed.

CITATION LIST

Patent Literatures

Patent Literature 1: WO 2013/008705 A
Patent Literature 2: WO 2015/136954 A

SUMMARY OF INVENTION

Technical Problem

As described above, a hydride-containing compound has an ability for intake/release of electron or an ability for intake/release of hydride ion (hereinafter, sometimes also referred to as "electron or hydride ion intake/release property"), and has a variety of characteristics such as ammonia synthesis activity due to the unique effect.

An object of the present invention is, for example, to provide a material having a high electron or hydride ion intake/release property, which contains hydride in a larger amount.

Solution to Problem

The present inventors have found, for example, that a lanthanoid oxyhydride has a high electron or hydride ion intake/release property, and by using the lanthanoid oxyhydride, a catalyst or the like having excellent ammonia synthesis activity can be obtained, and thus have reached the present invention.

That is, the present invention is as follows.
[1] An electron or hydride ion intake/release material, comprising a lanthanoid oxyhydride represented by the following formula (1).

[Chemical formula 1]

(In the formula (1), Ln represents a lanthanoid element.)
[2] The electron or hydride ion intake/release material described in [1], wherein the lanthanoid oxyhydride has a structure in which a hydride ion (H⁻) and an oxide ion (O²⁻) coexist as a HO-ordered type or a HO-solid solution type together with a lanthanoid as a component of a crystal lattice.
[3] The electron or hydride ion intake/release material described in [1], wherein the lanthanoid oxyhydride has a structure in which a hydride ion (H⁻) and an oxide ion (O²⁻) coexist as a HO-solid solution type together with a lanthanoid as a component of a crystal lattice.
[4] An electron or hydride ion intake/release composition, comprising at least one kind of lanthanoid oxyhydride.
[5] The electron or hydride ion intake/release composition described in [4], wherein a lanthanoid element contained in the lanthanoid oxyhydride is at least one kind selected from the group consisting of Gd, Sm, Pr, and Er.
[6] The electron or hydride ion intake/release composition described in [4], wherein a lanthanoid element contained in the lanthanoid oxyhydride is at least one kind selected from the group consisting of Gd, Sm, and Er.

[7] The electron or hydride ion intake/release composition described in [4], wherein the lanthanoid oxyhydride is represented by the following formula (2).

[Chemical formula 2]

(In the formula (2), Ln represents a lanthanoid element.)
[8] The electron or hydride ion intake/release composition described in [7], in which Ln in the above formula (2) is at least one kind selected from the group consisting of Gd, Sm, Pr, and Er.
[9] The electron or hydride ion intake/release composition described in [7], in which Ln in the above formula (2) is at least one kind selected from the group consisting of Gd, Sm, and Er.
[10] The electron or hydride ion intake/release composition described in [4], in which the lanthanoid oxyhydride has at least one kind of crystal structure selected from the group consisting of an ordered fluorite-type structure (P4/nmm), a PbCl₂-type structure (Pnma), and an Fe₂P-type structure (P62m).
[11] The electron or hydride ion intake/release composition described in [4], in which the lanthanoid oxyhydride is a lanthanoid oxyhydride having a crystal structure obtained by heating a lanthanoid oxide and a lanthanoid hydride under a pressure of at least 2 GPa or more in the absence of gas.
(In this regard, the expression "in the absence of gas" means a state in which when a lanthanoid oxide and a lanthanoid hydride are, for example, packed in a reaction vessel, the reaction vessel is filled with the lanthanoid oxide and the lanthanoid hydride so that dead volume is not generated in the vessel, or means a vacuum state.)
[12] A transition metal-supported material, comprising a transition metal supported by the electron or hydride ion intake/release material or electron or hydride ion intake/release composition of any one of [1] to [11], wherein the transition metal excludes a lanthanoid element.
[13] The transition metal-supported material described in [12], wherein the transition metal is at least one kind selected from the group consisting of Ru, Fe, Co, Cr, and Mn.
[14] A catalyst, comprising the transition metal-supported material described in [12] or [13].
[15] The catalyst described in [14], which has hydrogen reduction activity.
(In this regard, the expression "hydrogen reduction activity" means ability to enhance the reactivity of the reduction reaction using hydrogen gas or a hydrogen compound as a reducing agent, and to promote the reaction.)
[16] The catalyst described in [14], which has ammonia synthesis activity.
[17] Use as an electron or hydride ion intake/release material, of a lanthanoid oxyhydride obtained by a production method comprising the steps of: (1) mixing a lanthanoid oxide and a metal hydride (with the proviso that a lanthanoid hydride is excluded); (2) heating the obtained mixture under atmospheric pressure or more in the absence of gas or in the presence of hydrogen gas or an inert gas; and (3) washing and removing a by-product metal oxide and an unreacted metal hydride, if necessary, after the above heating step.
(In this regard, the expression "in the absence of gas" means a state in which when a lanthanoid oxide and a metal hydride are, for example, packed in a reaction vessel, the reaction vessel is filled with the lanthanoid oxide and the metal hydride so that dead volume is not generated in the vessel, or means a vacuum state.)

[18] Use as an electron or hydride ion intake/release material, of a lanthanoid oxyhydride obtained by a production method comprising the steps of: (1) mixing a lanthanoid oxide and a lanthanoid hydride; and (2) heating the obtained mixture under a pressure of at least 2 GPa or more in the absence of gas.
(In this regard, the expression "in the absence of gas" means a state in which when a lanthanoid oxide and a lanthanoid hydride are, for example, packed in a reaction vessel, the reaction vessel is filled with the lanthanoid oxide and the lanthanoid hydride so that dead volume is not generated in the vessel, or a means vacuum state.)
[19] The use as an electron or hydride ion intake/release material, of a lanthanoid oxyhydride, described in [17] or [18], wherein a heating temperature is 400 to 900° C. and a heating time is 12 to 72 hours, in the above heating step.
[20] Use as a catalyst, of a transition metal-supported material obtained by a production method comprising the steps of: (1) mixing a lanthanoid oxide and a metal hydride (with the proviso that a lanthanoid hydride is excluded); (2) heating the obtained mixture under atmospheric pressure or more (preferably, under a pressure of less than 1 GPa) in the absence of gas or in the presence of hydrogen gas or an inert gas; (3) washing and removing a by-product metal oxide and an unreacted metal hydride, if necessary, after the above heating step; and (4) supporting a transition metal on the obtained lanthanoid oxyhydride by an impregnation method, wherein the transition metal excludes a lanthanoid element.
(In this regard, the expression "in the absence of gas" means a state in which when a lanthanoid oxide and a metal hydride are, for example, packed in a reaction vessel, the reaction vessel is filled with the lanthanoid oxide and the metal hydride so that dead volume is not generated in the vessel, or means a vacuum state.)
[21] Use as a catalyst, of a transition metal-supported material obtained by a production method comprising the steps of: (1) mixing a lanthanoid oxide and a lanthanoid hydride; (2) heating the obtained mixture under a pressure of at least 2 GPa or more in the absence of gas; and (3) supporting a transition metal on the obtained lanthanoid oxyhydride by an impregnation method, wherein the transition metal excludes a lanthanoid element.
(In this regard, the expression "in the absence of gas" means a state in which when a lanthanoid oxide and a lanthanoid hydride are, for example, packed in a reaction vessel, the reaction vessel is filled with the lanthanoid oxide and the lanthanoid hydride so that dead volume is not generated in the vessel, or means a vacuum state.)
[22] The use as a catalyst, of a transition metal-supported material, described in [20] or [21], wherein the impregnation method comprises the steps of: (A) dispersing the lanthanoid oxyhydride in a solution prepared by dissolving a transition metal compound in a solvent, and then evaporating the solvent to obtain a supported material precursor; and (B) heating the obtained supported material precursor in a reducing atmosphere to obtain a transition metal-supported material in which a transition metal in the transition metal compound is supported by the oxyhydride as a nano-metal particle.
[23] The use as a catalyst, of a transition metal-supported material, described in [22], in which a heating temperature is 100 to 700° C. and a heating time is 1 to 5 hours, in heating the supported material precursor in the impregnation method.
[24] A method for producing ammonia, comprising the steps of: supplying a gas containing hydrogen and nitrogen as a raw material so that the gas comes into contact with the transition metal-supported material or catalyst of any one of [12] to [16]; and synthesizing ammonia by heating the transition metal-supported material or catalyst under an atmosphere of the gas.
[25] The method for producing ammonia described in [24], in which a mixing mole ratio of nitrogen to hydrogen in the gas is around 1/10 to 1/1, a reaction temperature in the step of synthesizing ammonia is room temperature to less than 500° C., and a reaction pressure in the step of synthesizing ammonia is 10 kPa to 20 MPa.
[26] The method for producing ammonia described in [24] or [25], wherein the atmosphere of the gas in the step of synthesizing ammonia is an atmosphere of a water vapor partial pressure of 0.1 kPa or less.
[27] The method for producing ammonia described in any one of [24] to [26], comprising the step of removing an oxide attached onto a surface of the transition metal-supported material or catalyst of any one of [12] to [16] by reducing the transition metal-supported material or catalyst with hydrogen gas or a mixed gas of hydrogen and nitrogen, before supplying a gas containing hydrogen and nitrogen as a raw material.

Advantageous Effects of Invention

The electron or hydride ion intake/release material or electron or hydride ion intake/release composition according to the present invention has a high electron or hydride ion intake/release property, and by supporting a transition metal on the material or composition, a catalyst such as a catalyst having excellent ammonia synthesis activity can be obtained.

BRIEF DESCRIPTION OF DRAWINGS

FIG. 4 (c) shows diagrams illustrating an $Fe_2P$-type structure (P62m) that is a crystal structure of the lanthanoid oxyhydride contained in the electron or hydride ion intake/release composition according to the present invention.

EMBODIMENTS FOR CARRYING OUT THE INVENTION

Figure 1:
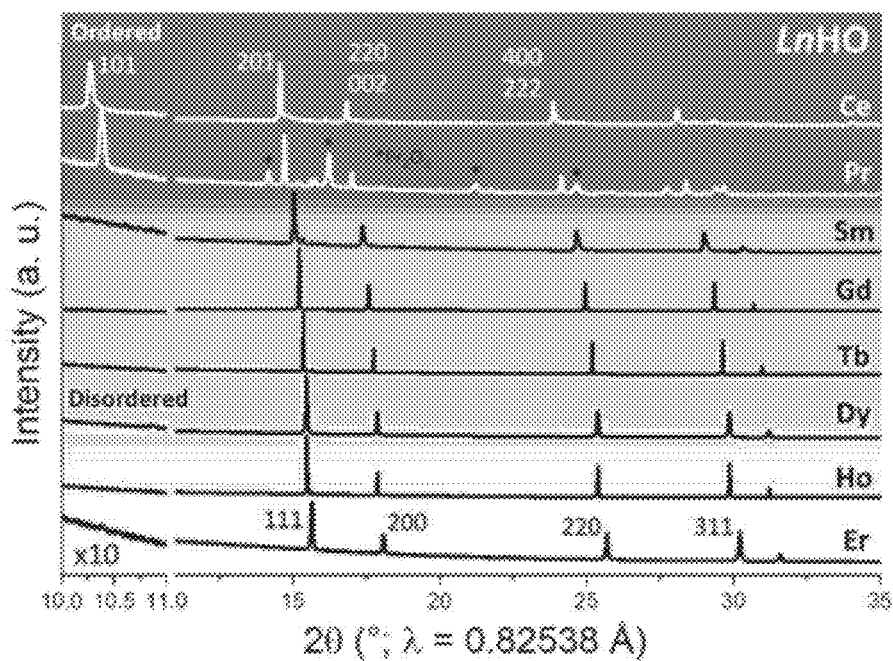
FIG. 1 shows X-ray diffraction patterns of the electron or hydride ion intake/release materials obtained in Examples 1 to 8 in order from the top.

<Electron or Hydride Ion Intake/Release Material, and Electron or Hydride Ion Intake/Release Composition>

The electron or hydride ion intake/release material according to the present invention is a hydride ion intake/release material consisting of a lanthanoid oxyhydride represented by the following formula (1), or a hydride ion intake/release material containing the lanthanoid oxyhydride. The electron or hydride ion intake/release material may contain other components as long as the performance that the material has is not lost.

[Chemical formula 3]

Ln(HO)  (1)

(In the formula (1), Ln represents a lanthanoid element.)

The electron or hydride ion intake/release composition according to the present invention is a hydride ion intake/release composition comprising at least one kind of lanthanoid oxyhydride, or a hydride ion intake/release composition comprising the lanthanoid oxyhydride. The electron or hydride ion intake/release composition may comprise other components as long as the performance that the composition has is not lost.

The lanthanoid oxyhydride may have a structure in which a hydride ion (H$^-$) and an oxide ion (O$^{2-}$) coexist as a HO-ordered type or a HO-solid solution type together with a lanthanoid as a component of a crystal lattice.

In this regard, the lanthanoid element (or lanthanoid) includes elements having atomic numbers of 57 to 71. Specifically, the lanthanoid element (or lanthanoid) includes lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

As a lanthanoid element (or lanthanoid) that is one of the components of a lanthanoid oxyhydride used in the electron or hydride ion intake/release material according to the present invention or a lanthanoid oxyhydride contained in the electron or hydride ion intake/release composition according to the present invention, at least one kind selected from the group consisting of Gd, Sm, Pr, and Er can be preferably mentioned, and more preferably, at least one kind selected from the group consisting of Gd, Sm, and Er can be mentioned.

The formula (1) represents a lanthanoid oxyhydride. The lanthanoid oxyhydride is a compound in which some of the oxide ions contained in an oxide of lanthanoid have been replaced with hydride ions (H$^-$).

The lanthanoid oxyhydride represented by the formula (1) specifically includes La(HO), Ce(HO), Pr(HO), Nd(HO), Pm(HO), Sm(HO), Eu(HO), Gd(HO), Tb(HO), Dy(HO), Ho(HO), Er(HO), Tm(HO), Yb(HO), and Lu(HO). Among them, with respect to La(HO), the ordered fluorite-type structure (P4/nmm) has been disclosed in Document (I): J. F. Brice, A. Moreau, Ann. Chim. Fr., 1982, 7 pp. 623-634, and Document (II): B. Malaman, J. F. Brice, J. Solid State Chem. 1984, 53, 44-54, and with respect to Nd(HO), the ordered fluorite-type structure (P4/nmm) has been disclosed in Document (III): M. Wideroe, J. Solid State Chem. 2011, 184, 1890-1894.

Further, in Document (I), outlines of the crystal structures of Ce(HO) and Pr(HO) have been disclosed.

With respect to the crystal structures of La(HO) and Nd(HO), the ordered fluorite-type structures (P4/nmm) have been discussed in the above Documents (I) to (III).

The lanthanoid oxyhydride contained in the electron or hydride ion intake/release composition according to the present invention has at least one kind of crystal structure selected from the group consisting of an ordered fluorite-type structure (P4/nmm), a PbCl$_2$-type structure (Pnma), and an Fe$_2$P-type structure (P62m).

These crystal structures are obtained by heating a lanthanoid oxide and a lanthanoid hydride under a pressure of at least 2 GPa or more in the absence of gas in the above-described method for producing the lanthanoid oxyhydride.

In this regard, the expression "in the absence of gas" means a state in which when a lanthanoid oxide and a lanthanoid hydride are, for example, packed in a reaction vessel, the reaction vessel is filled with the lanthanoid oxide and the lanthanoid hydride so that dead volume is not generated in the vessel, or means a vacuum state.

In the above heating step, as the heating temperature, for example, 400 to 900° C. can be mentioned, and as the heating time, for example, 12 to 72 hours can be mentioned.

Specifically, for example, in a case where the lanthanoid oxyhydride is a lanthanum oxyhydride, a powder of lanthanum oxide and a powder of lanthanum hydride are mixed, a sample of the obtained mixture powder is packed in a reaction vessel so that dead volume is not generated in the reaction vessel (that is, in the absence of gas), and then the reaction vessel is set in an anvil press device with a heating function, and the sample may be mechanically pressurized (under a pressure of at least 2 GPa or more) and heated.

Figure 4A:
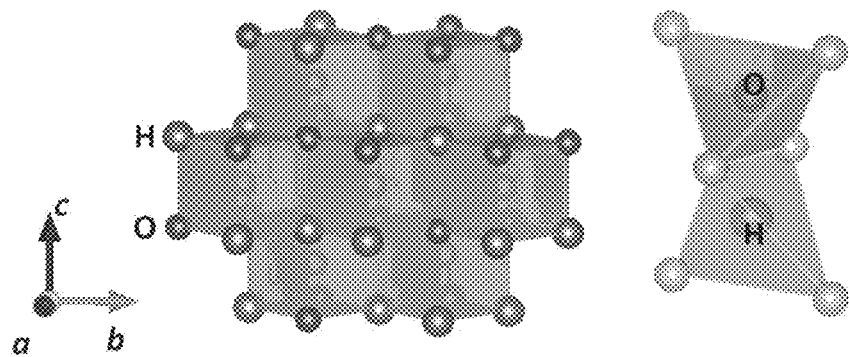
FIG. 4(a) shows diagrams illustrating an ordered fluorite-type structure (P4/nmm) that is a crystal structure of the lanthanoid oxyhydride contained in the electron or hydride ion intake/release composition according to the present invention.
Figure 4B:
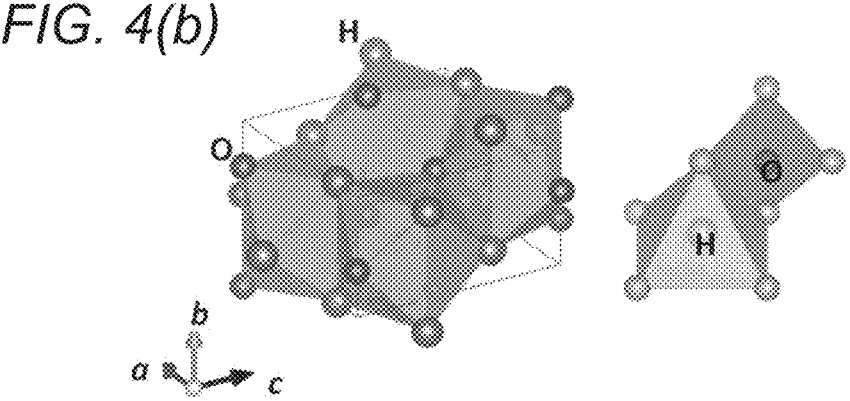
FIG. 4 (b) shows diagrams illustrating a $PbCl_2$-type structure (Pnma) that is a crystal structure of the lanthanoid oxyhydride contained in the electron or hydride ion intake/release composition according to the present invention.
Figure 4C:
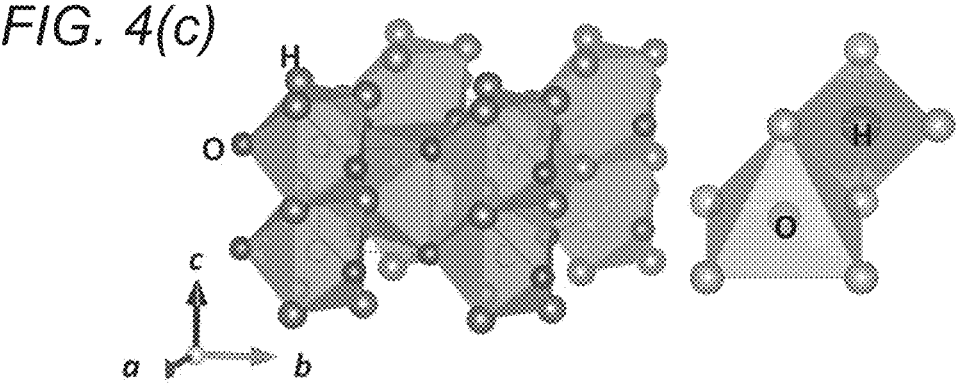

In this regard, as shown in FIG. 4 (a), if the pressure is atmospheric pressure, the crystal structure of the obtained lanthanoid oxyhydride is an ordered fluorite-type structure (P4/nmm), but as shown in FIG. 4 (b), if the pressure is 3 GPa, the crystal structure of the obtained lanthanoid oxyhydride is a PbCl$_2$-type structure (Pnma). Further, as shown in FIG. 4 (c), if the pressure is 5 GPa, the crystal structure of the obtained lanthanoid oxyhydride is an Fe$_2$P-type structure (P62m).

In addition, the crystal structure of the obtained lanthanoid oxyhydride corresponds to various conditions of the kind of lanthanoid element contained in the lanthanoid oxyhydride, the pressure, the heating time, and the like.

By the way, the crystal structure of the lanthanoid oxyhydride will be described in detail in Examples described later.

The lanthanoid oxyhydride contained in the electron or hydride ion intake/release composition according to the present invention may also be a compound represented by the following formula (2).

[Chemical formula 4]

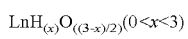

LnH$_{(x)}$O$_{((3-x)/2)}$ (0<x<3)  (2)

(In the formula (2), Ln represents a lanthanoid element.)

In this regard, the lanthanoid element includes elements similar to the ones described above.

The lanthanoid oxyhydride represented by the formula (2) specifically includes $La_{1-y'}(H_{1-x}O_{x/2})_{y'}$, $Ce_{1-y'}(H_{1-x}O_{x/2})_{y'}$, $Pr_{1-y'}(H_{1-x}O_{x/2})_{y'}$, $Nd_{1-y'}(H_{1-x}O_{x/2})_{y'}$, $Pm_{1-y'}(H_{1-x}O_{x/2})_{y'}$, $Sm_{1-y'}(H_{1-x}O_{x/2})_{y'}$, $EU_{1-y'}(H_{1-x}O_{x/2})_{y'}$, $Gd_{1-y'}(H_{1-x}O_{x/2})_{y'}$, $Tb_{1-y'}(H_{1-x}O_{x/2})_{y'}$, $Dy_{1-y'}(H_{1-x}O_{x/2})_{y'}$, $Ho_{1-y'}(H_{1-x}O_{x/2})_{y'}$, $Er_{1-y'}(H_{1-x}O_{x/2})_{y'}$, $Tm_{1-y'}(H_{1-x}O_{x/2})_{y'}$, $Yb_{1-y'}(H_{1-x}O_{x/2})_{y'}$, and $Lu_{1-y'}(H_{1-x}O_{x/2})_{y'}$.

The composition ratio of each element in the lanthanoid oxyhydride can be arbitrarily determined. That is, the value of x in the formula (2) can be arbitrarily determined within the range of $0<x<3$.

By changing the composition ratio of each element, a material having a different electron or hydride ion intake/release ability can be obtained for each lanthanoid element contained in the lanthanoid oxyhydride. Further, the lanthanoid oxyhydride may be one kind of lanthanoid oxyhydride, or may also be two or more kinds of lanthanoid oxyhydrides.

Depending on the desired performance, the composition ratio of each element, and the component kind of the lanthanoid element to be contained in the lanthanoid oxyhydride can be appropriately selected. In this regard, the lanthanoid oxyhydride having any composition ratio can also be synthesized by appropriately adjusting the atomic ratio of hydrogen and oxygen during the synthesis.

The electron or hydride ion intake/release material or electron or hydride ion intake/release composition according to the present invention is a material comprising a lanthanoid oxyhydride or a composition comprising at least one kind of lanthanoid oxyhydride, and has a high ability for intake/release of electron or hydride ion. The electron or hydride ion intake/release material or electron or hydride ion intake/release composition has such characteristics, and therefore, can be expected to be used in a variety of applications. For example, the electron or hydride ion intake/release material or electron or hydride ion intake/release composition according to the present invention can be used effectively as a catalyst such as a catalyst having excellent ammonia synthesis activity by supporting a transition metal on the material or composition.

The shape, size, and the like of the electron or hydride ion intake/release material or electron or hydride ion intake/release composition are not particularly limited, and may be appropriately determined depending on the application and the like using the material or composition.

The lanthanoid oxyhydride used in the electron or hydride ion intake/release material according to the present invention or the lanthanoid oxyhydride contained in the electron or hydride ion intake/release composition according to the present invention may be produced by, for example, a method comprising the following steps ((1) High-pressure method, or (2) Atmospheric pressure method).

<(1) High-Pressure Method>

A production method comprising the following steps:
(1) mixing a lanthanoid oxide and a lanthanoid hydride; and
(2) heating the obtained mixture under a pressure of at least 2 GPa or more in the absence of gas.

In this regard, the expression "in the absence of gas" means a state in which when a lanthanoid oxide and a lanthanoid hydride are, for example, packed in a reaction vessel, the reaction vessel is filled with the lanthanoid oxide and the lanthanoid hydride so that dead volume is not generated in the vessel, or means a vacuum state.

In the above heating step, as the heating temperature, for example, 400 to 900° C. can be mentioned, and as the heating time, for example, 12 to 72 hours can be mentioned. In addition, as the pressure in the heating step, for example, 2 GPa or more and less than 6 GPa, and preferably 2 GPa or more and less than 4 GPa can be mentioned.

Specifically, for example, the lanthanoid oxyhydride used in the electron or hydride ion intake/release material according to the present invention or the lanthanoid oxyhydride contained in the electron or hydride ion intake/release composition according to the present invention may be produced by mixing a lanthanoid oxide and a lanthanoid hydride, and heating the mixture, for example, under a high pressure of 3 GPa, 5 GPa, or the like. As the heating temperature, for example, around 900° C. can be mentioned. Further, as the heating time, for example, 12 to 72 hours can be mentioned.

In this regard, in such a method, for example, a powder of lanthanum oxide and a powder of lanthanum hydride are mixed, a sample of the obtained mixture powder is packed in a reaction vessel so that dead volume is not generated in the reaction vessel (that is, in the absence of gas), and then the reaction vessel is set in an anvil press device with a heating function, and the sample may be mechanically pressurized (under a pressure of at least 2 GPa or more) and heated. The detailed production method will be described in Examples.

In this regard, the chemical reaction is represented by the following formula (3).

[Chemical formula 5]

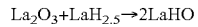
$$La_2O_3 + LaH_{2.5} \rightarrow 2LaHO \quad (3)$$

(In the formula (3), Ln represents a lanthanoid element.)

<(2) Atmospheric Pressure Method>

A production method comprising the following steps:
(1) mixing a lanthanoid oxide and a metal hydride (with the proviso that a lanthanoid hydride is excluded);
(2) heating the obtained mixture under atmospheric pressure or more (preferably, pressure of less than 1 GPa) in the absence of gas or in the presence of hydrogen gas or an inert gas; and
(3) washing and removing a by-product metal oxide and an unreacted metal hydride, if necessary, after the above heating step.

In this regard, the expression "in the absence of gas" means a state in which when a lanthanoid oxide and a metal hydride are, for example, packed in a reaction vessel, the reaction vessel is filled with the lanthanoid oxide and the metal hydride so that dead volume is not generated in the vessel, or means a vacuum state.

As the heating temperature in the above heating step, although depending on the lanthanoid oxyhydride to be produced, for example, 200 to 900° C., preferably 300 to 900° C., more preferably 400 to 900° C., and particularly preferably 600 to 700° C. can be mentioned. Further, as the heating time in the heating step, although depending on the lanthanoid oxyhydride to be produced, for example, 2 to 72 hours, preferably 12 to 72 hours or 2 to 36 hours, and more preferably 12 to 36 hours can be mentioned.

Specifically, for example, the lanthanoid oxyhydride used in the electron or hydride ion intake/release material according to the present invention or the lanthanoid oxyhydride contained in the electron or hydride ion intake/release composition according to the present invention may be produced by mixing a lanthanoid oxide and, for example, a metal hydride such as calcium hydride, sodium hydride, or lithium hydride, and heating the mixture under atmospheric pressure in the absence of gas (for example, a state in which when a lanthanoid oxide and a metal hydride are, for example, packed in a reaction vessel, the reaction vessel is filled with the lanthanoid oxide and the metal hydride so that dead volume is not generated in the vessel, or in a vacuum) or in the presence of hydrogen gas. Examples of the amount of the metal hydride such as calcium hydride to be mixed can include preferably 300 to 1000 mol %, and more preferably 300 to 400 mol %, with respect to the lanthanoid oxide. As the heating temperature, for example, 400 to 900° C., and preferably 600 to 700° C. can be mentioned. Further, as the heating time, 12 to 72 hours, and preferably 12 to 36 hours can be mentioned. The detailed production method will be described in Examples.

In this regard, in a case where the metal hydride is calcium hydride, the chemical reaction is represented by the following formula (4).

[Chemical formula 6]

$$Ln_2O_3 + 2CaH_2 \rightarrow 2LnHO + 2CaO \tag{4}$$

(In the formula (4), Ln represents a lanthanoid element.)

<Transition Metal-Supported Material>

The transition metal-supported material according to the present invention is a transition metal-supported material wherein a transition metal is supported by the electron or hydride ion intake/release material or electron or hydride ion intake/release composition according to the present invention. In this regard, the transition metal excludes a lanthanoid element.

In the transition metal-supported material, the transition metal may be at least one kind selected from the group consisting of Ru, Fe, Co, Cr, and Mn.

Typical examples of the transition metal-supported material according to the present invention are shown below.

(1) La(HO)
Ru/La(HO), Fe/La(HO), Co/La(HO), Cr/La(HO), and Mn/La(HO)
(2) Ce(HO)
Ru/Ce(HO), Fe/Ce(HO), Co/Ce(HO), Cr/Ce(HO), and Mn/Ce(HO)
(3) Pr(HO)
Ru/Pr(HO), Fe/Pr(HO), Co/Pr(HO), Cr/Pr(HO), and Mn/Pr(HO)
(4) Nd(HO)
Ru/Nd(HO), Fe/Nd(HO), Co/Nd(HO), Cr/Nd(HO), and Mn/Nd(HO)
(5) Pm(HO)
Ru/Pm(HO), Fe/Pm(HO), Co/Pm(HO), Cr/Pm(HO), and Mn/Pm(HO)
(6) Sm(HO)
Ru/Sm(HO), Fe/Sm(HO), Co/Sm(HO), Cr/Sm(HO), and Mn/Sm(HO)
(7) Eu(HO)
Ru/Eu(HO), Fe/Eu(HO), Co/Eu(HO), Cr/Eu(HO), and Mn/Eu(HO)
(8) Gd(HO)
Ru/Gd(HO), Fe/Gd(HO), Co/Gd(HO), Cr/Gd(HO), and Mn/Gd(HO)
(9) Tb(HO)
Ru/Tb(HO), Fe/Tb(HO), Co/Tb(HO), Cr/Tb(HO), and Mn/Tb(HO)
(10) Dy(HO)
Ru/Dy(HO), Fe/Dy(HO), Co/Dy(HO), Cr/Dy(HO), and Mn/Dy(HO)
(11) Ho(HO)
Ru/Ho(HO), Fe/Ho(HO), Co/Ho(HO), Cr/Ho(HO), and Mn/Ho(HO)
(12) Er(HO)
Ru/Er(HO), Fe/Er(HO), Co/Er(HO), Cr/Er(HO), and Mn/Er(HO)
(13) Tm(HO)
Ru/Tm(HO), Fe/Tm(HO), Co/Tm(HO), Cr/Tm(HO), and Mn/Tm(HO)
(14) Yb(HO)
Ru/Yb(HO), Fe/Yb(HO), Co/Yb(HO), Cr/Yb(HO), and Mn/Yb(HO)
(15) Lu(HO)
Ru/Lu(HO), Fe/Lu(HO), Co/Lu(HO), Cr/Lu(HO), and Mn/Lu(HO)

<Catalyst Comprising Transition Metal-Supported Material>

The catalyst according to the present invention is a catalyst comprising the transition metal-supported material according to the present invention. The catalyst has a high electron or hydride ion intake/release ability. Since the catalyst has such a characteristic, the catalyst can be expected to be used in a variety of applications such as a catalyst having hydrogen reduction activity, and a catalyst having ammonia synthesis activity. In particular, the catalyst can be effectively used as a catalyst for ammonia synthesis. In this regard, the expression "hydrogen reduction activity" means ability to enhance the reactivity of the reduction reaction using hydrogen gas or a hydrogen compound as a reducing agent, and to promote the reaction.

It is considered that the reason why the transition metal-supported material acts as a catalyst for ammonia synthesis is because a hydride ion present in a lanthanoid oxyhydride that is contained in a catalyst support (electron or hydride ion intake/release material, or electron or hydride ion intake/release composition) exerts a unique effect on a nitrogen molecule and a hydrogen molecule of the raw materials. That is, it can be inferred that a lanthanoid oxyhydride contained in the catalyst support dissociates a nitrogen molecule and a hydrogen molecule at around 300 to 450° C. on a transition metal as an active species, excessive dissociated hydrogen species preferentially spill over onto the support, and at the same time, N—N bond dissociation can be promoted by the electron donation from a hydride ion. It is considered that this suppresses the poisoning due to the accumulation of hydrogen into a particle of transition metal as the active species. This is considered to be because the catalytic support has a function due to an unknown attribute of a hydride ($H^-$)-containing lanthanoid oxyhydride under the conditions of ammonia synthesis, which is completely different from the conventional catalytic support.

In addition, as is clear from Examples described below, as the ammonia synthesis activity of the transition metal-supported material according to the present invention, for example, (1) ammonia synthesis activity of 10 mmol·$g^{-1}$·$h^{-1}$ or more in a case where the reaction pressure of a mixed gas of nitrogen and hydrogen in ammonia synthesis reaction is 5 MPa, (2) ammonia synthesis activity of 5 mmol·$g^{-1}$·$h^{-1}$ or more in a case where the reaction pressure of a mixed gas of nitrogen and hydrogen in ammonia synthesis reaction is 1 MPa, (3) ammonia synthesis activity of 1 mmol·$g^{-1}$·$h^{-1}$ or more in a case where reaction pressure of a mixed gas of nitrogen and hydrogen in the ammonia synthesis reaction is 0.1 MPa, or the like can be preferably mentioned.

The embodiment in a case of using the transition metal-supported material according to the present invention as a catalyst for ammonia synthesis will be described below.

From the viewpoint of obtaining a catalyst having high ammonia synthesis activity, as the lanthanoid element (or lanthanoid) that is one of the components of a lanthanoid oxyhydride contained in a catalyst support (electron or hydride ion intake/release material, or electron or hydride ion intake/release composition), preferably, at least one kind selected from the group consisting of Gd, Sm, Pr, and Er can be mentioned, more preferably, at least one kind selected from the group consisting of Gd, Sm, and Er can be mentioned, furthermore preferably, at least one kind selected from the group consisting of Gd, and Sm can be mentioned, and particularly preferably, Gd can be mentioned.

From the viewpoint of obtaining the high catalytic activity, as the specific surface area of a lanthanoid oxyhydride contained in a catalyst support (electron or hydride ion intake/release material, or electron or hydride ion intake/release composition), which is measured by a $N_2$ adsorption BET method, preferably 1 $m^2/g$ or more can be mentioned, and more preferably, 5 $m^2/g$ or more can be mentioned. The upper limit value of the specific surface area is not particularly limited, and may be practically around 15 $m^2/g$.

From the viewpoint of obtaining the high catalytic activity, as the average particle diameter of a lanthanoid oxyhydride contained in a catalyst support (electron or hydride ion intake/release material, or electron or hydride ion intake/release composition), preferably 2 μm or less can be mentioned, and more preferably, 500 nm or less can be mentioned. In this regard, the average particle diameter is a numerical value obtained by assuming that the particles are spherical in shape, on the basis of the specific surface area measured by a $N_2$ adsorption BET method.

From the viewpoint of obtaining a catalyst having high activity, as the transition metal to be supported by a lanthanoid oxyhydride contained in a catalyst support (electron or hydride ion intake/release material, or electron or hydride ion intake/release composition), preferably Ru, Fe, Co, or Mn can be mentioned, and more preferably, Ru can be mentioned.

As the transition metal to be supported by a lanthanoid oxyhydride contained in a catalyst support (electron or hydride ion intake/release material, or electron or hydride ion intake/release composition), preferably a transition metal in the form of particles can be mentioned.

Further, as the average particle diameter, for example, preferably, 1 to 50 nm can be mentioned, and more preferably 2 to 5 nm can be mentioned. In this regard, the average particle diameter is a numerical value obtained by assuming that the particles are spherical in shape, on the basis of the specific surface area measured by a $N_2$ adsorption BET method.

As the amount of the transition metal to be supported by a lanthanoid oxyhydride contained in a catalyst support (electron or hydride ion intake/release material, or electron or hydride ion intake/release composition), for example, preferably, 0.1 to 20% by mass can be mentioned, more preferably, 1 to 10% by mass can be mentioned, and furthermore preferably, 2 to 6% by mass can be mentioned, with respect to the lanthanoid oxyhydride. In this regard, in a case where the amount of the transition metal to be supported is less than 0.1% by mass, the catalytic activity tends to be low. On the other hand, in a case where the amount of the transition metal to be supported exceeds 20% by mass, there is a tendency that the ammonia synthesis activity corresponding to the supported amount is not recognized.

The shape of the catalyst for ammonia synthesis is not particularly limited, and may be in the form of powder, or may also be a molded body formed into a certain shape such as a cylindrical shape, a ring shape, or a spherical shape, by molding a powder or the like by an extrusion molding method or a tablet molding method, an irregular shaped body crushed after being molded into a certain shape, or the like.

The transition metal-supported material according to the present invention may be produced by, for example, a method comprising the following steps.

<First Method (Corresponding to "(1) High-Pressure Method" Above)>

A production method comprising the following steps:
(1) mixing a lanthanoid oxide and a lanthanoid hydride;
(2) heating the obtained mixture under a pressure of at least 2 GPa or more in the absence of gas; and
(3) supporting a transition metal on the obtained lanthanoid oxyhydride by an impregnation method.

In this regard, the transition metal excludes a lanthanoid element.

In this regard, the expression "in the absence of gas" means a state in which when a lanthanoid oxide and a lanthanoid hydride are, for example, packed in a reaction vessel, the reaction vessel is filled with the lanthanoid oxide and the metal hydride so that dead volume is not generated in the vessel, or means a vacuum state.

In addition, in the above heating step, as the heating temperature, for example, 400 to 900° C. can be mentioned, and as the heating time, for example, 12 to 72 hours can be mentioned.

<Second Method (Corresponding to "(2) Atmospheric Pressure Method" Above)>

A production method comprising the following steps:
(1) mixing a lanthanoid oxide and a metal hydride (with the proviso that a lanthanoid hydride is excluded);
(2) heating the obtained mixture under atmospheric pressure or more in the absence of gas or in the presence of hydrogen gas or an inert gas;
(3) washing and removing a by-product metal oxide and an unreacted metal hydride, if necessary, after the above heating step; and
(4) supporting a transition metal on the obtained lanthanoid oxyhydride by an impregnation method.

In this regard, the transition metal excludes a lanthanoid element.

In this regard, the expression "in the absence of gas" means a state in which when a lanthanoid oxide and a metal hydride are, for example, packed in a reaction vessel, the reaction vessel is filled with the lanthanoid oxide and the metal hydride so that dead volume is not generated in the vessel, or means a vacuum state.

In addition, as the heating temperature in the above heating step (that is, reaction temperature for thermal decomposition of the transition metal compound), although depending on the lanthanoid oxyhydride, for example, 200 to 900° C., preferably 300 to 900° C., more preferably 400 to 900° C., and particularly preferably 600 to 700° C. can be mentioned. Further, as the heating time in the heating step, although depending on the lanthanoid oxyhydride, for example, 2 to 72 hours, preferably 12 to 72 hours or 2 to 36 hours, and more preferably 12 to 36 hours can be mentioned.

The impregnation method can comprise, for example, the following steps:
(A) dispersing the lanthanoid oxyhydride in a solution prepared by dissolving a transition metal compound in a solvent (for example, an organic solvent such as hexane, acetone, or tetrahydrofuran), and then evaporating the solvent to obtain a supported material precursor; and
(B) heating the obtained supported material precursor in a reducing atmosphere to obtain a transition metal-supported material in which a transition metal in the transition metal compound is supported by the oxyhydride as a nano-metal particle.

In this regard, as the heating temperature in heating a supported material precursor in the impregnation method (that is, reaction temperature for reduction of the transition metal compound), for example, 100 to 700° C., and preferably 300 to 600° C. can be mentioned. Further, as the heating time in heating the supported material precursor, for example, 1 to 5 hours can be mentioned.

As the transition metal compound, for example, a chloride, a carbonyl compound, or a complex can be mentioned, and among them, from the point that the above-described characteristics of a lanthanoid oxyhydride contained in a catalyst support (electron or hydride ion intake/release material, or electron or hydride ion intake/release composition) can be maintained, and further the decomposition is easy, a carbonyl compound, or a complex can be preferably mentioned. For example, in a case where the transition metal to be supported is Ru, examples of the transition metal compound include ruthenium chloride, ruthenium carbonyl, ruthenium acetylacetonate, ruthenium potassium cyanate, potassium ruthenate, ruthenium oxide, and ruthenium nitrate.

One example of the method for producing the transition metal-supported material according to the present invention will be described below.

The lanthanoid oxyhydride contained in a catalyst support (electron or hydride ion intake/release material, or electron or hydride ion intake/release composition) may be produced by a method shown as the production method of the lanthanoid oxyhydride used in the electron or hydride ion intake/release material or the lanthanoid oxyhydride contained in the electron or hydride ion intake/release composition. By grinding the produced lanthanoid oxyhydride appropriately by ball milling or the like, a specific surface area and an average particle diameter each in the ranges described above can be obtained.

In order to support a transition metal on a lanthanoid oxyhydride contained in a catalyst support (electron or hydride ion intake/release material, or electron or hydride ion intake/release composition), a method shown as the production method of the transition metal-supported material according to the present invention may be used. By grinding the produced transition metal-supported material appropriately by ball milling or the like, a desired specific surface area and a desired average particle diameter can be obtained.

By the way, in the present invention, by supporting a transition metal as an active species on a catalyst support (electron or hydride ion intake/release material, or electron or hydride ion intake/release composition), a transition metal-supported material as a catalyst (particularly, catalyst for ammonia synthesis) may be produced.

A catalyst has a wide range of applications, and is essential in economically producing chemical products by using a catalytic reaction, in petrochemistry, coal chemistry, C1 chemistry for producing various chemical products from methane, ammonia synthesis, and the like, and therefore, many catalytic processes (for example, a Ziegler-Natta catalyst for polymerizing alkenes, and a catalyst for detoxifying a nitrogen oxide and a sulfur oxide) have been developed according to the demands of society.

The catalyst can be roughly classified into a heterogeneous catalyst and a homogeneous catalyst. In the former, the reaction proceeds on a surface of a catalyst, and therefore, the surface chemistry is important. In the latter, the reaction proceeds in a solution in many cases, and therefore, knowledge of the solution chemistry is required. Further, in the catalytic chemistry, analysis of the reactions using various kinetic or spectroscopic techniques is often performed, and therefore, generally, extensive knowledge of the physical chemistry is required. Further, the catalytic reaction involves an organic compound in many cases, and therefore, knowledge of the organic chemistry is also required.

In addition, the heterogeneous catalyst is typically produced by pelletizing a powdered/granulated transition metal-supported material, extruding or granulating the pelletized material, and then firing the extruded or granulated material, and/or optionally undergoing a reduction stage. Alternatively, the catalyst support formed by pelletizing or extruding a material is impregnated with a solution of active species, and the impregnated material is dried before firing and a reduction stage. As being applied in a catalytic reaction to which the diversity of geometric structures and physical properties of the provided catalysts is intended, pelletization, and extrusion and granulation methods, which are effective for the catalytic reaction, may be appropriately selected (see also below).

As the method for preparing such a heterogeneous catalyst, for example, an impregnation method, or a sol-gel method can be mentioned.

An impregnation method is the simplest method as a method for producing a catalyst, and is commonly used. The catalyst production by an impregnation method has an advantage that most of the supported active species are exposed on a surface, but on the other hand, it is required to prepare (or purchase) the catalyst support to be used as a support in advance. Further, the supporting state may be affected by the characteristics of the powder or granules used as a catalyst support, and in particular, in a case where powder or granules having a small specific surface area are used as a support, since a large number of active species cannot be supported, the catalyst activity per amount of the catalyst may be limited, and therefore, in each case, it is better to confirm in advance whether the amount of the catalyst is appropriate or not.

In the present invention, in producing an ammonia synthesis catalyst for synthesizing ammonia by reacting hydrogen with nitrogen by using a gas containing the hydrogen and the nitrogen as the raw material, for example, a catalyst support to be used as the support is prepared in advance (catalyst support forming step). If necessary, the catalyst support may be washed with a solvent such as a $NH_4Cl$ saturated methanol solution under a nitrogen atmosphere to remove by-products and unreacted raw materials, the remaining solid content is recovered by suction filtration and dried under a nitrogen atmosphere, and thus a catalyst support having a higher purity is formed.

Subsequent to such a catalyst support forming step, active species are supported by the catalyst support prepared in advance above (active species supporting step). The active species supporting step may be performed in a solvent in which a transition metal-containing compound has been previously dissolved. The solution in which the transition metal-containing compound has been dissolved, and the catalyst support obtained in the previous step are mixed with each other while stirring.

Examples of the device for stirring include a rotary stirring device such as a rotor blade stirrer, or a high-speed rotary shear stirrer (homogenizer or the like), and a known stirring device such as a pendulum linear motion-type stirrer, a shaking machine to shake the whole vessel, or a vibration-type stirrer using ultrasonic waves or the like. The rotation speed of stirring blade or rotary blade in the rotary stirring device may be appropriately adjusted to such an extent that the inconvenience such as scattering of liquid does not occur, by taking into account the shapes of the vessel, the stirring blade, the baffle plate, etc., the amount of liquid, and the like. The stirring may be performed continuously, or intermittently, but it is preferred to perform the stirring continuously.

As the stirring time, for example, 30 minutes or more can be mentioned, and preferably 30 minutes to 24 hours can be mentioned. Further, as the temperature during the stirring, for example, 20 to 80° C. can be mentioned, and preferably 40 to 70° C. can be mentioned.

As the mixing ratio in the above-described mixture, for example, 0.1 to 20% by volume of transition metal-containing compound can be mentioned, and preferably 2% by volume of transition metal-containing compound can be mentioned, with respect to the catalyst support. Next, the solvent is removed under reduced pressure. As the temperature for removing the solvent, for example, 5 to 120° C. can be mentioned, and preferably ordinary temperature can be mentioned. As the pressure, for example, 0.1 to 0.1 MPa can be mentioned, and preferably 4 kPa can be mentioned.

Due to the stirring above, the transition metal-containing compound, for example, forms a complex with a catalyst support, and is dispersed substantially uniformly and finely. After that, the solvent was vaporized and removed (usually, by distillation under reduced pressure, vacuum distillation, heating, or centrifugation) to recover a transition metal-supported material having high activity.

As the requirements for the solvent to be used in the active species supporting step, for example, easy volatilization, a simple structure, and further high solubility of a transition metal-containing compound (specifically, for example, a compound containing a transition metal as an oxide, a nitride, an oxynitride, a chloride, a carbonyl compound, or a transition metal complex), and the like can be mentioned. As the main solvent that has a simple structure, volatilizes at low temperature, and further has high solubility of a transition metal-containing compound in a room temperature state, for example, tetrahydrofuran, acetone, acetonitrile, hexane, isopropanol, ethanol, methanol, or the like can be mentioned. Basically, any solvent can support as long as it dissolves, but in a case where the solubility is low, the solvent is a dilute solution, and therefore, the step involves costs. Further, in the present invention, the transition metal-containing compound is dissolved in the solvent in advance, and the resultant solution may be added to the catalyst support obtained by the previous step.

In addition, if necessary, in order to perform the formation of an oxide of the catalyst support and the metalization of the supported active species substantially at the same time, a heat treatment (as the temperature, for example, 100 to 700° C.) may be performed in a vacuum, under reduced pressure, for example, under an atmosphere of reducing gas such as hydrogen, carbon monoxide, or ammonia, and/or for example, under an atmosphere of an inert gas such as nitrogen, argon, or helium. Preferably, a transition metal compound contained in the transition metal-containing compound is reduced by performing the heating in a reducing atmosphere, or a transition metal compound contained in the transition metal-containing compound is thermally decomposed by heating the transition metal-containing compound in a vacuum, to obtain a transition metal-supported material in which a transition metal is supported by a catalyst support as a nano-metal particle.

The heat treatment may be performed by using a firing furnace such as a rotary furnace, a fixed furnace, a tubular furnace, a tunnel furnace, a muffle furnace, or a fluidized firing furnace. From the viewpoint of preventing the molded body from being broken, it is preferred to use a fixed furnace. By performing such a heat treatment, the active species can be supported by the catalyst support in a more uniformly and more finely dispersed state (as the bulk density, for example, 0.6 to 0.85 kg/L). Accordingly, since the active species are effectively prevented from being buried in a catalyst support and the active species exposed on a surface of the catalyst can be secured, a transition metal-supported material having higher activity can be obtained as a better catalyst. In a case where the heat treatment is performed under an atmosphere of hydrogen, as the pressure of hydrogen, for example, 0.01 to 0.5 MPa can be mentioned, and preferably 0.1 MPa can be mentioned. By performing such a heat treatment, a catalyst that is chemically thermally stable and has high catalytic activity can be obtained.

By the way, it is considered that the reason why the heat treatment step is performed in a vacuum or under reduced pressure is because substances generated by condensation or the like and the solvent are easily vaporized in catalyst firing in the heat treatment step, and therefore, the crystal growth accompanying the reduction of the catalyst support can be suppressed. In the heat treatment step, the heat treatment is performed preferably under reduced pressure, and more preferably under vacuum in order to further exert the above effects.

Since the crystal structure of a transition metal-supported material is affected by the product of the firing temperature and the firing time, it is preferred to appropriately set the firing temperature and the firing time. As the firing temperature, for example, 100 to 700° C. can be mentioned, and preferably 300 to 600° C. can be mentioned. Further, as the firing time, for example, 3 to 48 hours can be mentioned, preferably 3 to 24 hours, and more preferably 1 to 5 hours can be mentioned.

In molding a transition metal-supported material, it is better to obtain a molded body having excellent formability and strength with the addition of a small amount of binder. In this regard, the molding may be performed before the heat treatment step, or may be performed after the heat treatment step.

Such a transition metal-supported material is shaped by tablet molding, extrusion molding, a rolling granulation method, a spray-drying method, or the like, and put into practical use. The shape of the molded body is not particularly limited, and examples of the shape include a spherical shape, a cylindrical shape, a (cylindrically-shaped) ring, and a star shape. Among them, a molded body having a cylindrical shape, or a ring shape, which has high crushing strength of the molded catalyst, is preferred.

In order to obtain a practical strength, for example, a cellulose derivative, graphite, talc, an inorganic fiber, silica, alumina, or the like may be used as a binder in an amount of 20% by weight or more, and preferably around 50% by weight. However, since the amount of catalyst is relatively reduced with the addition of a binder, the amount of the catalyst to be packed is increased in order to maintain the desired reaction results. Accordingly, a binder that gives practical catalyst strength with the addition of the binder in the minimum amount is desired.

In addition, as the crushing strength of the molded body thus obtained, for example, 6.5 to 9.5 kgf can be mentioned, preferably 7.0 to 9.0 kgf can be mentioned, and more preferably 7.0 to 8.0 kgf can be mentioned. By setting the crushing strength of the molded body to be 6.5 kgf or more, the generation of cracking and chipping can be suppressed during packing into and operation of a fixed-bed reactor. Further, by setting the crushing strength of the molded body to be 9.5 kgf or less, the yield (initial yield) in the initial reaction stage is further improved.

As the catalytic reaction, reaction that can be selected from, for example, hydroprocessing such as hydrodesulfurization, or hydrogenation, for example, steam reforming such as pre-reforming, catalytic steam reforming, autothermal reforming, secondary reforming, or a reforming process used for direct reduction of iron, catalytic partial oxidation, for example, a water gas shift such as isothermal shift, sour shift, low temperature shift, intermediate temperature shift, medium temperature shift, or high temperature shift reaction, methanation synthesis by Fischer-Tropsch reaction, methanol synthesis, ammonia synthesis, ammonia oxidation, nitrous oxide decomposition reaction, and selective oxidation and reduction reaction of exhaust gases from an internal combustion engine or a power station can be mentioned.

In using such a catalytic reaction, a promoter for catalyst activation may be further supported in an amount required for improving the activity. As the supporting method, for example, a method wherein a solution of a promoter is added to a transition metal-containing compound, and the resultant solution is heated to 50 to 120° C. and dried while stirring can be mentioned. As the amount of the promoter to be added, for example, a molar amount 1 to 50 times, preferably a molar amount 10 times, and more preferably 5 times or 3 times the molar amount of transition metal can be mentioned.

In a case of using the transition metal-supported material according to the present invention as a catalyst for ammonia synthesis, the ammonia synthesis reaction may be performed, for example, as follows.

In order to react hydrogen with nitrogen by using a gas containing the hydrogen and the nitrogen as the raw material, the catalyst for ammonia synthesis is packed in a catalytic packed bed in a reactor, and then the raw material gas is reacted on the catalyst layer present in the catalytic packed bed to synthesize ammonia.

In typical one embodiment of ammonia synthesis reaction, a mixed gas of nitrogen and hydrogen is directly reacted under heat and pressure in the same manner as in the conventional Haber-Bosch method, and ammonia formed by the reaction represented by $N_2 + 3H_2 \rightarrow 2NH_3$ may be cooled or absorbed in water to be separated.

The nitrogen gas and hydrogen gas are supplied so as to come into contact with the catalyst layer present in the catalytic packed bed installed in the reactor. In this regard, it is preferred to remove an oxide and the like, which have adhered to a surface of the catalyst layer (that is, surface of the catalyst), by reducing the surface of the catalyst layer with hydrogen gas or a mixed gas of hydrogen and nitrogen before supplying the nitrogen and hydrogen gases.

As the reactor, any one of a batch-type reaction vessel, a closed circulation-type reaction device, and a flow-type reaction device may be accepted, but preferably a flow-type reaction device can be mentioned from the practical viewpoint.

The ammonia synthesis reaction may be performed in an atmosphere containing as little water as possible, that is, in dry nitrogen and hydrogen, which is an atmosphere with a water vapor partial pressure of around 0.1 kPa or less.

Ammonia is synthesized by heating the transition metal-supported material according to the present invention as a catalyst under an atmosphere of a mixed gas of nitrogen and hydrogen as the raw material.

The ammonia synthesis reaction may be performed under the condition of a mixing mole ratio of nitrogen to hydrogen of around 1/10 to 1/1. As the reaction temperature, for example, preferably room temperature to less than 500° C. can be mentioned, and more preferably 300 to 350° C. can be mentioned. In addition, the lower the reaction temperature is, the more advantageous for the ammonia formation the reaction equilibrium is, but in order to obtain a sufficient rate of ammonia formation and at the same time to make the reaction equilibrium advantageous for the ammonia formation, the reaction temperature is preferably in the above range.

In the ammonia synthesis reaction, as the reaction pressure of a mixed gas of nitrogen and hydrogen, it is not particularly limited, but preferably 10 kPa to 20 MPa, and more preferably 10 kPa to 5 MPa can be mentioned. In addition, in consideration of the practical use, the reaction pressure is preferably from atmospheric pressure to pressurized condition, and more preferably around 100 kPa to 1.5 MPa.

In the obtained gas containing ammonia, only the ammonia may be separated by a known method, if necessary. Further, a recycling process in which the raw material gas is further separated from the remaining gas and used again as the raw material gas may be included.

As described above, the lanthanoid oxyhydride contained in the electron or hydride ion intake/release composition according to the present invention may be a compound represented by the formula (2). In the process of performing the method for producing ammonia according to the present invention, the composition ratio of each element in the lanthanoid oxyhydride of the present invention may be such that the value of x and the value of y in the formula (2) are always constant values, but may be varied within the ranges.

EXAMPLES

Hereinafter, the present invention will be described in more detail by way of Examples.

(Measurement of BET Specific Surface Area)

The measurement of the BET specific surface area in each of the following Examples and Comparative Examples was performed by a simple measurement (BET single point method) in which the adsorption at liquid nitrogen temperature and the desorption at room temperature were pulse measured. The analysis conditions are as follows.

[Measurement Conditions]

Device: BELCAT II manufactured by MicrotracBEL Corp.

Adsorption gas: nitrogen 10% by volume (diluted with helium gas)

BET single point method (X-Ray Diffraction Measurement)

X-Ray diffraction data were obtained at room temperature by using a Debye-Scherrer camera at a synchrotron radiation facility (SPring-8, BL02B2 beamline).

Electron or Hydride Ion Intake/Release Material

Example 1

Under a nitrogen atmosphere, 0.001 mol of $Ce_2O_3$ and 0.003 mol of $CaH_2$ were mixed with each other, and the obtained mixture was pelletized, and then the pelletized mixture was vacuum sealed in a quartz glass tube having an inner diameter of 10 mm and a length of 200 mm (less than $5\times10^{-4}$ MPa).

The resultant quartz glass tube (in which the pelletized mixture had been contained) was heated at 650° C. for 20 hours. After the heat treatment, the heated mixture was taken out from the quartz glass tube under a nitrogen atmosphere, and the taken-out mixture was washed with around 200 mL of $NH_4Cl$ saturated methanol solution to remove CaO and unreacted $CaH_2$. The remaining powder was recovered by suction filtration, the recovered powder was dried under a nitrogen atmosphere to obtain an electron or hydride ion intake/release material comprising a lanthanoid oxyhydride represented by Ce(HO) (that is, an electron or hydride ion intake/release composition comprising a lanthanoid oxyhydride represented by Ce(HO)).

Examples 2 to 10

In Examples 2 to 10, an electron or hydride ion intake/release material comprising a lanthanoid oxyhydride represented by each of Pr(HO), Sm(HO), Gd(HO), Tb(HO), Dy(HO), Ho(HO), Er(HO), La(HO), and Nd(HO) (that is, an electron or hydride ion intake/release composition comprising a lanthanoid oxyhydride represented by Pr(HO), Sm(HO), Gd(HO), Tb(HO), Dy(HO), Ho(HO), Er(HO), La(HO), and Nd(HO)) was obtained in a similar operation as in Example 1 except that each of $Pr_2O_3$, $Sm_2O_3$, $Gd_2O_3$, $Tb_2O_3$, $Dy_2O_3$, $HO_2O_3$, $Er_2O_3$, $La_2O_3$, and $Nd_2O_3$ was used in place of the $Ce_2O_3$ being the raw material.

By using each of the electron or hydride ion intake/release materials obtained in Examples 1 to 8 as an analysis sample, the above-described X-ray diffraction analysis was performed. The obtained X-ray diffraction patterns are shown in FIG. 1. FIG. 1 shows X-ray diffraction patterns, which were obtained in the electron or hydride ion intake/release materials (that is, electron or hydride ion intake/release compositions each comprising a lanthanoid oxyhydride) obtained in Examples from 1 to 8, in order from the top. From FIG. 1, it was confirmed that the electron or hydride ion intake/release materials (that is, electron or hydride ion intake/release compositions each comprising a lanthanoid oxyhydride) obtained in Examples from 1 to 8 included lanthanoid oxyhydrides represented by Ce(HO), Pr(HO), Sm(HO), Gd(HO), Tb(HO), Dy(HO), Ho(HO), and Er(HO), respectively.

Further, in the X-ray diffraction patterns of the electron or hydride ion intake/release materials comprising lanthanoid oxyhydrides represented by Ce(HO) and Pr(HO), respectively (that is, electron or hydride ion intake/release compositions comprising lanthanoid oxyhydrides represented by Ce(HO) and Pr(HO), respectively, the peak of (101) appeared, and therefore, it was confirmed that hydrogen atoms and oxygen atoms are arranged with regularity in the electron or hydride ion intake/release materials comprising lanthanoid oxyhydrides represented by Ce(HO) and Pr(HO), respectively (that is, electron or hydride ion intake/release compositions comprising a lanthanoid oxyhydrides represented by Ce(HO) and Pr(HO), respectively.

On the other hand, in the X-ray diffraction patterns of the electron or hydride ion intake/release materials comprising lanthanoid oxyhydrides represented by Sm(HO), Gd(HO), Tb(HO), Dy(HO), Ho(HO), and Er(HO), respectively (that is, electron or hydride ion intake/release compositions comprising lanthanoid oxyhydrides represented by Sm(HO), Gd(HO), Tb(HO), Dy(HO), Ho(HO), and Er(HO)), respectively, the peak of (101) did not appear, and therefore, it was confirmed that hydrogen atoms and oxygen atoms are arranged without having any regularity in the electron or hydride ion intake/release materials comprising lanthanoid oxyhydrides represented by Sm(HO), Gd(HO), Tb(HO), Dy(HO), Ho(HO), and Er(HO), respectively (that is, electron or hydride ion intake/release compositions comprising lanthanoid oxyhydrides represented by Sm(HO), Gd(HO), Tb(HO), Dy(HO), Ho(HO), and Er(HO), respectively).

Figure 2:
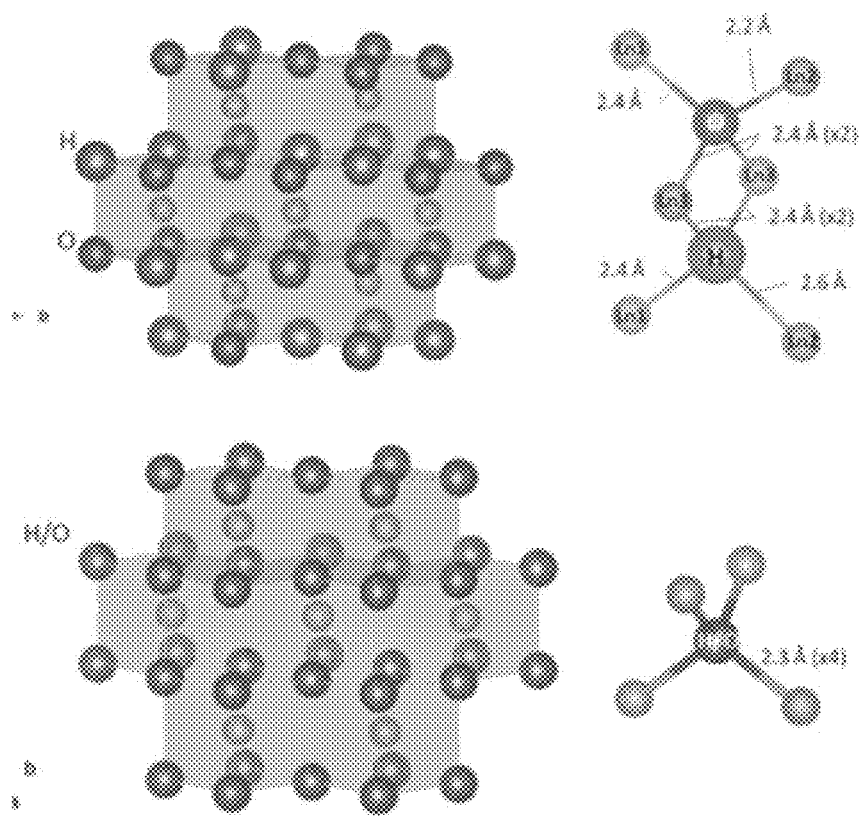
FIG. 2 shows diagrams illustrating atomic arrangements in the crystal structures of the lanthanoid oxyhydrides used in the present invention. Two diagrams on the left side in FIG. 2 illustrate atomic arrangements of lanthanoid atoms (Ln), hydrogen atoms (H), and oxygen atoms (O) in the whole crystal structures of the lanthanoid oxyhydrides used in the present invention. Two diagrams on the right side in FIG. 2 illustrate bonding modes of lanthanoid atoms (Ln), hydrogen atoms (H), and oxygen atoms (O) in the whole crystal structures of the lanthanoid oxyhydrides used in the present invention.

FIG. 2 shows diagrams illustrating atomic arrangements in the crystal structures of the lanthanoid oxyhydrides used in the present invention. Two diagrams on the left side in FIG. 2 illustrate atomic arrangements of lanthanoid atoms (Ln), hydrogen atoms (H), and oxygen atoms (O) in the whole crystal structures of the lanthanoid oxyhydrides used in the present invention. Two diagrams on the right side in FIG. 2 illustrate bonding modes of lanthanoid atoms (Ln), hydrogen atoms (H), and oxygen atoms (O) in the whole crystal structures of the lanthanoid oxyhydrides used in the present invention.

From the analysis in FIG. 1, it can be inferred that the electron or hydride ion intake/release materials comprising lanthanoid oxyhydrides represented by Ce(HO) and Pr(HO), respectively (that is, electron or hydride ion intake/release compositions comprising lanthanoid oxyhydrides represented by Ce(HO) and Pr(HO), respectively), each have a crystal structure shown in two diagrams on the upper side in FIG. 2. It is considered that in this crystal structure, positions of hydrogen atoms (H) and oxygen atoms (O) are fixed, and as shown in the diagram on the upper right side in FIG. 2, positions of hydrogen atoms (H) and oxygen atoms (O) are completely separated, and the position of hydrogen atom (H) and the position of oxygen atom (O) are alternately repeated.

On the other hand, it can be inferred that the electron or hydride ion intake/release materials comprising lanthanoid oxyhydrides represented by Sm(HO), Gd(HO), Tb(HO), Dy(HO), Ho(HO), and Er(HO), respectively (that is, electron or hydride ion intake/release compositions comprising lanthanoid oxyhydrides represented by Sm(HO), Gd(HO), Tb(HO), Dy(HO), Ho(HO), and Er(HO), respectively), each have a crystal structure shown in two diagrams on the lower side in FIG. 2. It is considered that in this crystal structure, hydrogen atoms (H) and oxygen atoms (O) that are bonded to a lanthanoid atom (Ln) are solid-solubilized in the structure, the positions of hydrogen atom (H) and oxygen atom (O) are not fixed, and are not separated, and the hydrogen atoms (H) and oxygen atoms (O) are not regularly present in the structure, but are randomly present at the position marked with "H/O" in the diagram on the lower right side in FIG. 2 with a probability of 50% each.

From the above consideration, it can be inferred that oxyhydrides of La, Ce, Pr, and Nd, which are elements of atomic numbers 57 to 60 among lanthanoid elements each have a HO separation type structure shown on the upper side in FIG. 2, and oxyhydrides of Pm, Sm, Eu, Gd, Tb, Dy, Ho, Er, Tm, Yb, and Lu, which are elements of atomic numbers 61 to 71 among lanthanoid elements each have a HO solid solution type structure shown on the lower side in FIG. 2.

Transition Metal-Supported Material

Example 11

An electron or hydride ion intake/release material comprising a lanthanoid oxyhydride represented by Sm(HO) (that is, electron or hydride ion intake/release composition comprising a lanthanoid oxyhydride represented by Sm(HO)), which had been obtained in Example 3, was placed in a pot made of alumina filled with nitrogen gas together with alumina balls, and then the material was ground at 240 rpm for 12 hours by using Planetary ball mills (P-5 manufactured by Fritsch GmbH). The BET specific surface area of a powder of the obtained electron or hydride ion intake/release material (that is, electron or hydride ion intake/release composition) was 7.67 m$^2$/g.

Under a nitrogen atmosphere, 0.01 g of $Ru_3(CO)_{12}$ was dissolved in around 60 mL of hexane, and in the obtained solution, 0.5 g of the above powder was dispersed, and then the obtained dispersion was mixed for around 30 minutes while stirring. The solvent was removed from the obtained mixture under reduced pressure to obtain a powder of a supported material precursor. The obtained powder was vacuum sealed (less than $5\times10^{-4}$ MPa) in a glass tube having an inner diameter of 10 mm and a length of 200 mm, and then by heating the resultant glass tube (containing the powder) at 390° C. for 3 hours, a powder of the transition metal-supported material (Ru/SmHO) in which Ru was supported by a lanthanoid oxyhydride represented by Sm(HO) was obtained. The amount of the supported Ru in the obtained transition metal-supported material was 0.8% by mass with respect to the lanthanoid oxyhydride represented by Sm(HO) being the catalyst support. After that, the obtained transition metal-supported material was stored under a nitrogen atmosphere.

Example 12

An electron or hydride ion intake/release material comprising a lanthanoid oxyhydride represented by Gd(HO) (that is, electron or hydride ion intake/release composition comprising a lanthanoid oxyhydride represented by Gd(HO)), which had been obtained in Example 4, was placed in a pot made of alumina filled with nitrogen gas together with alumina balls, and then the material was ground at 240 rpm for 12 hours by using Planetary ball mills (P-5 manufactured by Fritsch GmbH). The BET specific surface area of a powder of the obtained electron or hydride ion intake/release material (that is, electron or hydride ion intake/release composition) was 7.67 m$^2$/g.

Under a nitrogen atmosphere, 0.01 g of $Ru_3(CO)_{12}$ was dissolved in around 60 mL of hexane, and in the obtained solution, 0.5 g of the above powder was dispersed, and then the obtained dispersion was mixed for around 30 minutes while stirring. The solvent was removed from the obtained mixture under reduced pressure to obtain a powder of a supported material precursor. The obtained powder was vacuum sealed (less than $5\times10^{-4}$ MPa) in a glass tube having an inner diameter of 10 mm and a length of 200 mm, and then by heating the resultant glass tube (containing the powder) at 390° C. for 3 hours, a powder of the transition metal-supported material (Ru/GdHO) in which Ru was supported by a lanthanoid oxyhydride represented by Gd(HO) was obtained. The amount of the supported Ru in the obtained transition metal-supported material was 0.8% by mass with respect to the lanthanoid oxyhydride represented by Gd(HO) being the catalyst support. After that, the obtained transition metal-supported material was stored under a nitrogen atmosphere.

Examples 13 to 19

In Examples 13 to 19, powders of transition metal-supported materials (Ru/CeHO), (Ru/PrHO), (Ru/DyHO), (Ru/HoHO), (Ru/ErHO), (Ru/LaHO), and (Ru/NdHO) were obtained in a similar operation as in Example 11 except that lanthanoid oxyhydrides represented by Ce(HO), Pr(HO), Dy(HO), Ho(HO), Er(HO), La(HO), and Nd(HO), which had been obtained in Examples 1, 2, and 6 to 10, respectively, were each used in place of the lanthanoid oxyhydride represented by Sm(HO).

The BET specific surface area and other properties of each of the powders of the electron or hydride ion intake/release materials (that is, obtained electron or hydride ion intake/release compositions), which had been obtained in Examples 13 to 19, respectively, are shown in Table 1. Further, the amount of the supported Ru in the transition metal-supported material was 0.8% by mass in any case, with respect to the catalyst support.

TABLE 1

| | Transition metal-supported material | BET specific surface area (m$^2$/g) | Amount of supported Ru (nominal) (% by mass) | Amount of supported Ru (real) (% by mass) | Ru dispersion (%) | Ru particle diameter (nm) |
|---|---|---|---|---|---|---|
| Example 11 | Ru/SmHO | 11.0 | 1.0 | 0.8 | 4.7 | 28.4 |
| Example 12 | Ru/GdHO | 12.0 | 1.0 | 0.8 | 13.9 | 9.7 |
| Example 13 | Ru/CeHO | 22.1 | 1.0 | 0.8 | 22.7 | 5.9 |
| Example 14 | Ru/PrHO | 14.0 | 1.0 | 0.8 | 12.4 | 39.5 |
| Example 15 | Ru/DyHO | 5.8 | 1.0 | 0.8 | 21.1 | 6.4 |
| Example 16 | Ru/HoHO | 5.5 | 1.0 | 0.8 | 25.8 | 5.2 |
| Example 17 | Ru/ErHO | 26.3 | 1.0 | 0.8 | 19.2 | 7.0 |
| Example 18 | Ru/LaHO | 16.4 | 1.0 | 0.8 | 14.9 | 9.0 |
| Example 19 | Ru/NdHO | 3.6 | 1.0 | 0.8 | 5.2 | 25.6 |

After that, the obtained transition metal-supported materials were stored under a nitrogen atmosphere.

Comparative Example 1

Under a nitrogen atmosphere, a powder of MgO was dispersed in a solution prepared by dissolving $Ru_3(CO)_{12}$ in tetrahydrofuran (THF), and then the obtained dispersion was mixed for 3 hours while stirring. The solvent was removed from the obtained mixture under reduced pressure to obtain a powder of a supported material precursor. The obtained powder was vacuum sealed (less than $5\times10^{-4}$ MPa) in a glass tube having an inner diameter of 10 mm and a length of 200 mm, and then by heating the resultant glass tube (containing the powder) at 390° C. for 3 hours, a powder of the transition metal-supported material (Ru/MgO) in which Ru was supported by MgO was obtained. The amount of the supported Ru in the obtained transition metal-supported material was 1.0% by mass with respect to the MgO being the catalyst support.

Further, the transition metal-supported material (Ru/MgO) was impregnated with an ethanol solution of $Cs_2CO_3$, and then by thermally decomposing the $Cs_2CO_3$ impregnated into the transition metal-supported material, Ru—Cs/MgO (Ru/Cs=1) was obtained.

Catalyst for Ammonia Synthesis

Example 20

By using the transition metal-supported material (Ru/SmHO) in which Ru was supported by a lanthanoid oxyhydride represented by Sm(HO), which had been obtained in Example 11, as a catalyst for ammonia synthesis, ammonia synthesis was performed.

On a quartz wool, 0.1 g of the transition metal-supported material being the catalyst for ammonia synthesis was supported, and then the supported material was packed in a reaction tube using a ⅜" stainless steel tube. Next, hydrogen gas was passed through the reaction tube containing the catalyst at 400° C. at a rate of 90 mL/min for 2 hours.

Next, a mixed gas including high-purity nitrogen, hydrogen, and argon for internal standard ($N_2:H_2:Ar=22.5:67.5:10$ (volume ratio)) was passed through the reaction tube at a flow rate of 100 ml/min. The reaction temperature at this time was 400° C., and the reaction pressure was set to be 5 MPa, 1 MPa, and 0.1 MPa in terms of gauge pressure.

The formed ammonia was collected by a water trap and quantified with an ammonia selective electrode (X5002A manufactured by HORIBA, Ltd).

Examples 21 to 28

Ammonia synthesis was performed under the same conditions as in Example 20 except that the transition metal-supported materials (Ru/GdHO), (Ru/CeHO), (Ru/PrHO), (Ru/DyHO), (Ru/HoHO), (Ru/ErHO), (Ru/LaHO), and (Ru/NdHO), which had been obtained in Examples 12 to 19, respectively, were each used in place of the transition metal-supported material (Ru/SmHO) in which Ru was supported by a lanthanoid oxyhydride represented by Sm(HO), which had been obtained in Example 11.

Comparative Example 2

Ammonia synthesis was performed under the same conditions as in Example 20 except that Ru—Cs/MgO (amount of supported Ru to MgO: 1.0% by mass) obtained in Comparative Example 1 was used in place of the transition metal-supported material (Ru/SmHO) in which Ru was supported by a lanthanoid oxyhydride represented by Sm(HO), which had been obtained in Example 11. By the way, Ru—Cs/MgO is a catalyst that has been conventionally reported to have high ammonia synthesis activity.

Figure 3:
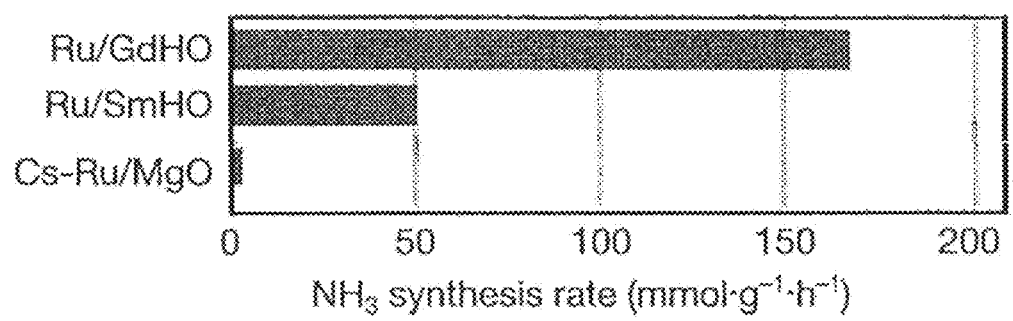
FIG. 3 shows a diagram comparing the ammonia synthesis catalytic activities of the catalysts used in Examples 11 and 12, and Comparative Example 2. The reaction conditions here are 400° C., and 5 MPa.

Ammonia synthesis activities of the catalysts for ammonia synthesis used in Examples 20 and 21 and Comparative Example 2 are shown in FIG. 3.

Results of Examples and Comparative Example are shown in Table 2.

TABLE 2

| | Transition metal-supported material | Catalytic activity (mmol · $g^{-1}$ · $h^{-1}$) 5 MPa | Catalytic activity (mmol · $g^{-1}$ · $h^{-1}$) 1 MPa | Catalytic activity (mmol · $g^{-1}$ · $h^{-1}$) 0.1 MPa |
|---|---|---|---|---|
| Example 20 | Ru/SmHO | 63 | 45 | 18 |
| Example 21 | Ru/GdHO | 160 | 63 | 22 |
| Example 22 | Ru/CeHO | 23 | 19 | 7 |
| Example 23 | Ru/PrHO | 74 | 36 | 11 |
| Example 24 | Ru/DyHO | 17.5 | 7.4 | 2 |
| Example 25 | Ru/HoHO | 10 | 14 | 5.5 |
| Example 26 | Ru/ErHO | 54 | 34 | 4.7 |
| Example 27 | Ru/LaHO | 45 | 32 | 15 |
| Example 28 | Ru/NdHO | 16 | 15 | 4.5 |
| Comparative Example 2 | RU-CS/MgO | 2.7 | ND* | ND* |

*ND: not detected

Example 29

A powder of lanthanum oxide ($La_2O_3$) in an amount of 0.174 g and a powder of lanthanum hydride ($LaH_{2.5}$) in an amount of 0.0759 g were mixed, a sample of the obtained mixture powder was packed in a tubular vessel (4 mm$\phi$×7 mm) made of stainless steel so that dead volume was not generated in the tubular vessel (that is, in the absence of gas), and then the vessel was set in an anvil press device with a heating function (manufactured by C&T Factory Co., Ltd), and the sample was mechanically pressurized to 3 GPa (by the way, the pressure was applied for 75 minutes), and then was heated at 900° C. for 1 hour (by the way, the pressure was released for 60 minutes). The reactant obtained by applying high-pressure heat treatment in this way was taken out from the vessel under a nitrogen atmosphere, and a lanthanum oxyhydride (La(HO)) was obtained.

Next, the obtained lanthanum oxyhydride was subjected to measurement by an X-ray diffraction analysis method, and the obtained data were analyzed. As a result, it was found that the crystal structure was a $PbCl_2$-type structure (Puma).

Similarly, also in the lanthanum oxyhydride obtained in a similar operation as in the above except that the pressure was changed from 3 GPa to 5 GPa, the crystal structure was analyzed by using a method similar to the above, and as a result of which it was found that the crystal structure was an $Fe_2P$-type structure (P62m).

Example 30

An electron or hydride ion intake/release material comprising a lanthanoid oxyhydride represented by La(HO) (that is, electron or hydride ion intake/release composition comprising a lanthanoid oxyhydride represented by La(HO)), which had been obtained under a pressure condition of 3 GPa in Example 29, was placed in a pot made of alumina filled with nitrogen gas together with alumina balls, and then the material was ground at 240 rpm for 12 hours by using Planetary ball mills (P-5 manufactured by Fritsch GmbH). The BET specific surface area of a powder of the obtained electron or hydride ion intake/release material (that is, electron or hydride ion intake/release composition) was 1.6 m$^2$/g.

Under a nitrogen atmosphere, 0.01 g of $Ru_3(CO)_{12}$ was dissolved in around 60 mL of hexane, and in the obtained solution, 0.5 g of the above powder was dispersed, and then the obtained dispersion was mixed for around 30 minutes while stirring. The solvent was removed from the obtained mixture under reduced pressure to obtain a powder of a supported material precursor. The obtained powder was vacuum sealed (less than $5\times10^{-4}$ MPa) in a quartz glass tube having an inner diameter of 10 mm and a length of 200 mm, and then by heating the resultant quartz glass tube (containing the powder) at 390° C. for 3 hours, a powder of the transition metal-supported material (Ru/LaHO) in which Ru was supported by a lanthanoid oxyhydride represented by La(HO) was obtained. The amount of the supported Ru in the obtained transition metal-supported material was 1% by mass with respect to the lanthanoid oxyhydride represented by La(HO) being the catalyst support. After that, the obtained transition metal-supported material was stored under a nitrogen atmosphere.

Example 31

By using the transition metal-supported material (hereinafter, Ru/LaHO-hp), which had been obtained in Example 30, ammonia synthesis was performed under the reaction conditions similar to those in Example 20 (reaction temperature: 400° C., flow rate of raw material gas: 100 mL/min, catalyst amount: 0.1 g, amount of supported Ru: 1% by weight). The reaction pressure was set to be 1 MPa and 0.1 MPa in terms of gauge pressure.

Example 32

By using the transition metal-supported material (hereinafter, Ru/LaHO-ss) in which Ru was supported in a similar operation as in Example 30, on the electron or hydride ion intake/release material comprising a lanthanoid oxyhydride represented by La(HO) (that is, electron or hydride ion intake/release composition comprising a lanthanoid oxyhydride represented by La(HO)), which had been obtained in Example 9, ammonia synthesis was performed under the reaction conditions similar to those in Example 31.

Comparative Example 3

By using a transition metal-supported material (Ru/$Pr_2O_3$) disclosed in Document (Sato, K. et al., Chem. Sci., 2017, 8, 674-679), ammonia synthesis was performed under the reaction conditions similar to those in Example 31. The reaction pressure was set to be 0.1 MPa in terms of gauge pressure.

Comparative Example 4

By using a transition metal-supported material (Ru/$Gd_2O_3$), ammonia synthesis was performed under the reaction conditions similar to those in Example 31. The reaction pressure was set to be 1 MPa in terms of gauge pressure.

Figure 5:
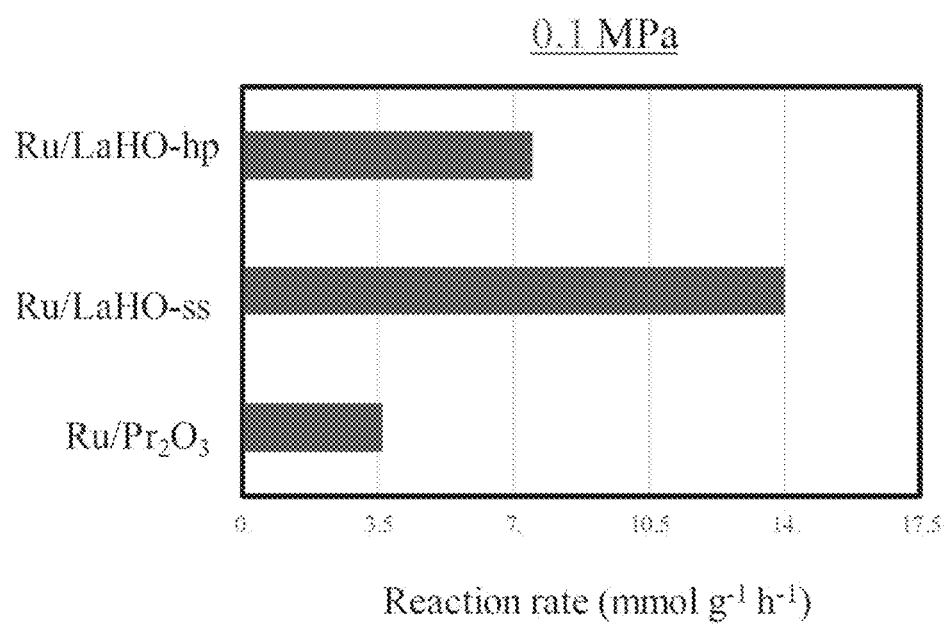
FIG. 5 shows a graph comparing the catalytic activities of Ru/LaHO-hp of Example 31, Ru/LaHO-ss of Example 32, and Ru/Pr$_2$O$_3$ of Comparative Example 3, which are obtained at a reaction pressure of 0.1 MPa.
Figure 6:
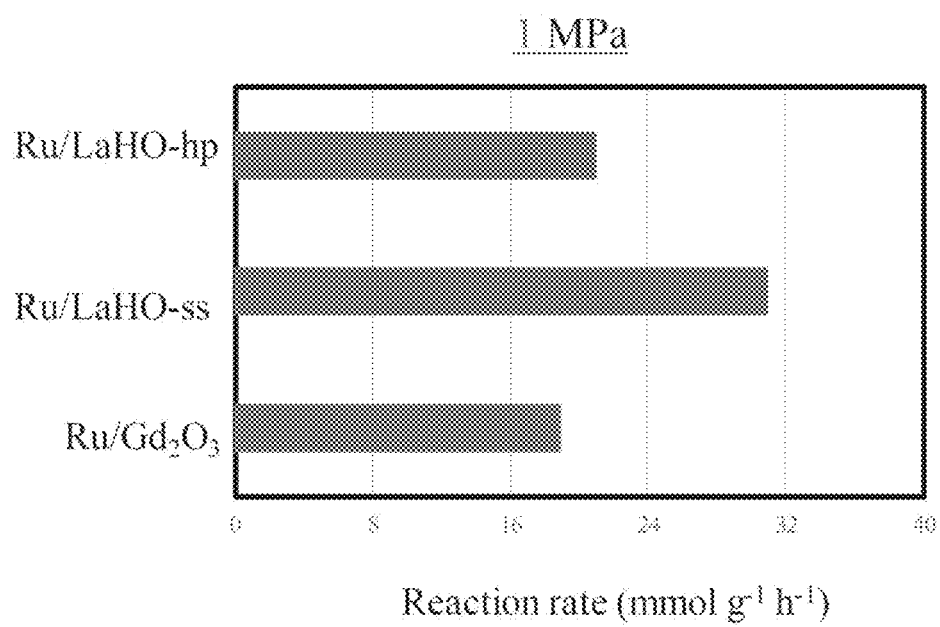
FIG. 6 shows a graph comparing the catalytic activities of Ru/LaHO-hp of Example 31, Ru/LaHO-ss of Example 32, and Ru/Gd$_2$O$_3$ of Comparative Example 4, which are obtained at a reaction pressure of 1 MPa.

Ammonia synthesis activities of the catalysts for ammonia synthesis used in Examples 31 and 32 and Comparative Examples 3 and 4 are shown in FIGS. 5 and 6, and in Table 3.

TABLE 3

| | Transition metal-supported material | Catalytic activity (mmol · g$^{-1}$ · h$^{-1}$) | |
|---|---|---|---|
| | | 0.1 MPa | 1 MPa |
| Example 31 | Ru/LaHO-hp | 7.5 | 21 |
| Example 32 | Ru/LaHO-ss | 14 | 31 |
| Comparative Example 3 | Ru/$Pr_2O_3$ | 3.6 | — |
| Comparative Example 4 | Ru/$Gd_2O_3$ | — | 18 |

INDUSTRIAL APPLICABILITY

The electron or hydride ion intake/release material or electron or hydride ion intake/release composition according to the present invention is a material comprising a lanthanoid oxyhydride or a composition comprising at least one kind of lanthanoid oxyhydride, and has a higher ability for intake/release of electron or hydride ion than that of a conventional hydride-containing compound, and therefore, can be expected to be used in a variety of applications. For example, the electron or hydride ion intake/release material or electron or hydride ion intake/release composition according to the present invention can be used effectively as a catalyst such as a catalyst having excellent ammonia synthesis activity by supporting a transition metal on the material or composition.

The invention claimed is:

1. An electron or hydride ion intake/release composition, comprising at least one member of lanthanoid oxyhydride, wherein the lanthanoid oxyhydride is represented by following formula (2):

$$LnH_{(x)}O_{((3-x)/2)} (0<x<3) \qquad (2)$$ 

wherein Ln represents a lanthanoid element, and
wherein the lanthanoid oxyhydride has at least one member of crystal structure selected from the group consisting of an ordered fluorite-type structure (P4/nmm), a $PbCl_2$-type structure (Pnma), and an $Fe_2P$-type structure (P62m).

2. The electron or hydride ion intake/release composition according to claim 1, wherein
a lanthanoid element contained in the lanthanoid oxyhydride is at least one member selected from the group consisting of Gd, Sm, Pr, and Er.

3. The electron or hydride ion intake/release composition according to claim 1, wherein
a lanthanoid element contained in the lanthanoid oxyhydride is at least one member selected from the group consisting of Gd, Sm, and Er.

4. The electron or hydride ion intake/release composition according to claim 1, wherein
Ln in the above formula (2) is at least one member selected from the group consisting of Gd, Sm, Pr, and Er.

5. The electron or hydride ion intake/release composition according to claim 1, wherein
Ln in the above formula (2) is at least one member selected from the group consisting of Gd, Sm, and Er.

6. A transition metal-supported material, comprising:
a transition metal supported by the electron or hydride ion intake/release composition of claim 1, wherein
the transition metal excludes a lanthanoid element.

7. The transition metal-supported material according to claim 6, wherein
the transition metal is at least one metal selected from the group consisting of Ru, Fe, Co, Cr, and Mn.

8. A catalyst, comprising
the transition metal-supported material according to claim 6.

9. The catalyst according to claim 8, which has ammonia synthesis activity.

10. A method for producing a lanthanoid oxyhydride for use as an electron or hydride ion intake/release material, the method comprising the steps of:
(1) mixing a lanthanoid oxide and a metal hydride (with the proviso that a lanthanoid hydride is excluded);
(2) heating the obtained mixture under atmospheric pressure or more in the absence of gas or in the presence of hydrogen gas or an inert gas, wherein a heating temperature is 400 to 900° C. and a heating time is 12 to 72 hours; and
(3) washing and removing a by-product metal oxide and an unreacted metal hydride, if necessary, after the heating step.

11. A method for producing a lanthanoid oxyhydride for use as an electron or hydride ion intake/release material, the method comprising the steps of:
(1) mixing a lanthanoid oxide and a lanthanoid hydride; and
(2) heating the obtained mixture under a pressure of at least 2 GPa or more in the absence of gas.

12. A method for producing a transition metal-supported material for use as a catalyst, the method comprising the steps of:
(1) mixing a lanthanoid oxide and a metal hydride (with the proviso that a lanthanoid hydride is excluded);
(2) heating the obtained mixture under atmospheric pressure or more in the absence of gas or in the presence of hydrogen gas or an inert gas;
(3) washing and removing a by-product metal oxide and an unreacted metal hydride, if necessary, after the heating step; and
(4) supporting a transition metal on the obtained lanthanoid oxyhydride by an impregnation method,
wherein the transition metal excludes a lanthanoid element.

13. The method according to claim 12, wherein
the impregnation method comprises the steps of:
(A) dispersing the lanthanoid oxyhydride in a solution prepared by dissolving a transition metal compound in a solvent, and then evaporating the solvent to obtain a supported material precursor; and
(B) heating the obtained supported material precursor in a reducing atmosphere to obtain a transition metal-supported material in which a transition metal in the transition metal compound is supported by the oxyhydride as a nano-metal particle.

14. The method according to claim 13, wherein
a heating temperature is 100 to 700° C. and a heating time is 1 to 5 hours, in heating the supported material precursor in the impregnation method.

15. A method for producing a transition metal-supported material for use as a catalyst, the method comprising the steps of:
(1) mixing a lanthanoid oxide and a lanthanoid hydride;
(2) heating the obtained mixture under a pressure of at least 2 GPa or more in the absence of gas; and
(3) supporting a transition metal on the obtained lanthanoid oxyhydride by an impregnation method,
wherein the transition metal excludes a lanthanoid element.

16. A method for producing ammonia, comprising the steps of:
supplying a gas containing hydrogen and nitrogen as a raw material so that the gas comes into contact with a transition metal-supported material or a catalyst comprising the transition metal-supported material; and
synthesizing ammonia by heating the transition metal-supported material or catalyst under an atmosphere of the gas,
wherein the transition metal-supported material comprises a transition metal supported by an electron or hydride ion intake/release material or electron or hydride ion intake/release composition, wherein the transition metal excludes a lanthanoid element;
wherein the electron or hydride ion intake/release material comprises a lanthanoid oxyhydride represented by following formula (1):

$$Ln(HO) \tag{1}$$

wherein Ln represents a lanthanoid element; and
wherein the electron or hydride ion intake/release composition comprises at least one member of lanthanoid oxyhydride.

17. The method for producing ammonia according to claim 16, wherein
a mixing mole ratio of nitrogen to hydrogen in the gas is around 1/10 to 1/1, a reaction temperature in the step of synthesizing ammonia is room temperature to less than 500° C., and a reaction pressure in the step of synthesizing ammonia is 10 kPa to 20 MPa.

18. The method for producing ammonia according to claim 16, wherein
the atmosphere of the gas in the step of synthesizing ammonia is an atmosphere of a water vapor partial pressure of 0.1 kPa or less.

19. The method for producing ammonia according to claim 16, further comprising the step of:
removing an oxide attached onto a surface of the transition metal-supported material or catalyst by reducing the transition metal-supported material with hydrogen gas or a mixed gas of hydrogen and nitrogen, before supplying a gas containing hydrogen and nitrogen as a raw material.

20. A method for enhancing a reactivity of a reduction reaction and promoting the reaction, the method comprising a step of applying hydrogen gas or a hydrogen compound as a reducing agent to a compound to be reduced in the presence of a catalyst comprising a transition metal-supported material;
wherein the transition metal-supported material comprises a transition metal supported by an electron or hydride ion intake/release material or electron or hydride ion intake/release composition, wherein the transition metal excludes a lanthanoid element;

wherein the electron or hydride ion intake/release material comprises a lanthanoid oxyhydride represented by the following formula (1):

$$Ln(HO)_5 \tag{1}$$

wherein Ln represents a lanthanoid element; and wherein the electron or hydride ion intake/release composition comprises at least one member of lanthanoid oxyhydride.

\* \* \* \* \*